United States Patent
Mansell et al.

[11] Patent Number: 6,108,121
[45] Date of Patent: Aug. 22, 2000

[54] MICROMACHINED HIGH REFLECTANCE DEFORMABLE MIRROR

[75] Inventors: Justin D. Mansell; Robert L. Byer, both of Stanford, Calif.

[73] Assignee: The Board of Trustees of the Leland Stanford Junior University, Palo Alto, Calif.

[21] Appl. No.: 09/047,180

[22] Filed: Mar. 24, 1998

[51] Int. Cl.$^7$ .................................................. G02B 26/08
[52] U.S. Cl. ........................ 359/291; 359/295; 359/224
[58] Field of Search .................... 359/290, 291, 359/292, 293, 294, 295, 224

[56] References Cited

U.S. PATENT DOCUMENTS

| | | | |
|---|---|---|---|
| 3,463,572 | 8/1969 | Preston | 350/360 |
| 4,203,128 | 5/1980 | Guckel et al. | 357/60 |
| 4,234,361 | 11/1980 | Guckel et al. | 148/186 |
| 4,657,358 | 4/1987 | Anthony et al. | 350/610 |
| 5,022,745 | 6/1991 | Zayhowski et al. | 350/608 |
| 5,703,728 | 12/1997 | Smith et al. | 359/871 |
| 5,719,846 | 2/1998 | Matoba et al. | 369/112 |

OTHER PUBLICATIONS

Thomas, I., Single layer TiO2 and Multilayer TiO2–SiO2 optical coatings prepared from colloidal suspensions, Applied Optics, 26(21), pp. 4688–4691, 1987.

Bifano, T. et al., Continuous–membrane surface–micromachined silicon deformable mirror, Opt. Eng., 36(5), pp. 1354–1360, 1997.

Vdovin, G. et al., Flexible mirror micromachined in silicon, Applied Optics, 34(16), pp. 2968–2972, 1995.

Grosso, R. et al., The membrane mirror as an adaptive optical element, J. Opt. Soc. Am., 67(3), pp. 399–406, 1977.

*Primary Examiner*—Georgia Epps
*Assistant Examiner*—Evelyn A. Lester
*Attorney, Agent, or Firm*—Lumen Intellectual Property Services

[57] ABSTRACT

A high reflectance deformable mirror includes first and second substrates. The first substrate has formed therein a membrane having a bottom surface and a polished top surface. The top surface of the membrane forms the mirror surface and is preferably covered with a high reflectance coating. The first substrate also has formed therein at least one pillar for deforming the membrane. The pillar is integrally formed with the membrane and extends from the bottom surface of the membrane. The second substrate has at least one actuating member positioned thereon for actuating the pillar. Further, the first substrate is mounted to the second substrate such that the bottom surface of the membrane faces the second substrate. In a preferred embodiment, the actuating member comprises an electrode for applying an electrostatic force to the pillar. Also disclosed are single substrate embodiments of the mirror and preferred methods for producing the mirror.

19 Claims, 16 Drawing Sheets

MICROMACHINED HIGH REFLECTANCE DEFORMABLE MIRROR

This invention was made with U.S. Government support under grant no. PHY-9630172 from the National Science Foundation. The U.S. Government has certain rights in this invention.

FIELD OF THE INVENTION

The present invention relates generally to the field of adaptive optics, and in particular to a micromachined high reflectance deformable mirror suitable for use in a wide range of adaptive optics applications.

BACKGROUND OF THE INVENTION

Interest in the field of adaptive optics has increased in recent years due to the need for higher quality optical systems. In particular, higher quality deformable mirrors are required for applications such as photolithography, optical data storage, high power lasers, and atmospheric compensation.

A conventional deformable mirror includes a top plate which forms a reflective surface. The top plate is supported by an array of piezoelectric or electrorestrictive actuators which sit on a thick base for support. In operation, the actuators are elongated due to an electric field, causing the top plate to be deformed in a controlled fashion. This conventional deformable mirror design has been used for many years, but the mirrors are very costly because of all the hand assembly required in their fabrication.

The fabrication limitations of conventional deformable mirrors and the need for inexpensive adaptive optics systems inspired several attempts to produce micromachined deformable mirrors. For example, Vdovin et al. disclose a micromachined deformable mirror in an article entitled "Flexible Mirror Micromachined in Silicon", Applied Optics, Vol. 34, No. 16, June, 1995. The mirror includes a silicon nitride membrane which forms the mirror surface. The nitride membrane is mounted above aluminum electrodes. In operation, the electrodes electrostatically deform the membrane. Unfortunately, the use of a silicon nitride membrane in a deformable mirror has two disadvantages. First, the thick layer of nitride required for the membrane is costly. Second, the silicon nitride membrane has low reflectivity, low power handling capability, and poor adjacent channel crosstalk.

Another deformable mirror design is disclosed by Bifano et al. in "Continuous-Membrane Surface-Micromachined Silicon Deformable Mirror", Optical Engineering, Vol. 36, No. 5, p.1354–60, May, 1997. Bifano discloses a deformable mirror produced by surface micromachining three layers of polycrystalline silicon and two sacrificial layers of silicon dioxide which separate the layers of polysilicon. The top layer of polysilicon forms the mirror surface. The bottom layer of polysilicon is used to create an array of electrode pads. The middle layer of polysilicon is patterned into an array of fixed-end double cantilevers which act as second electrodes for deforming the mirror. After the polysilicon layers are patterned, the sacrificial oxide layers are removed by drilling holes in the mirror surface and etching the mirror with hydrofluoric acid.

Bifano's mirror design suffers from several disadvantages. First, the top layer of polysilicon which forms the mirror surface is not polished to optical quality. Second, because the mirror surface must be drilled and etched in hydrofluoric acid, the mirror exhibits low reflectivity and high scatter loss. Thus, the micromachined mirrors presented thus far have a variety of optical problems including low power handling capability, low reflectivity, high scatter loss, and poor adjacent channel crosstalk.

OBJECTS AND ADVANTAGES OF THE INVENTION

In view of the above, it is an object of the present invention to provide a continuous membrane deformable mirror which has a high quality mirror surface, high power handling capability, and which reduces adjacent channel crosstalk. It is another object of the invention to provide a method for producing the deformable mirror which is both inexpensive and mass fabrication compatible.

These and other objects and advantages of the invention will be apparent after consideration of the ensuing description and the accompanying drawings.

SUMMARY

The above objects and advantages are attained by a high reflectance deformable mirror which includes first and second substrates. The first substrate has formed therein a membrane having a bottom surface and a polished top surface. The polished top surface of the membrane forms the mirror surface and is preferably covered with a high reflectance coating. In the preferred embodiment, the high reflectance coating comprises alternating layers of dielectric materials, such as $SiO_2$ and $TiO_2$, having different indexes of refraction. Alternatively, the high reflectance coating may comprise a layer of gold.

The first substrate also has formed therein at least one pillar for deforming the membrane. The pillar is integrally formed with the membrane and extends from the bottom surface of the membrane. The second substrate has at least one actuating member positioned thereon for actuating the pillar. Further, the first substrate is mounted to the second substrate such that the bottom surface of the membrane faces the second substrate.

In the preferred embodiment, the actuating member comprises an electrode for applying an electrostatic force to the pillar. In this embodiment, the pillar and the bottom surface of the membrane are preferably coated with a layer of electrically conductive material. Alternatively, the actuating member may comprise a beam of two materials which can be expanded at different rates due to thermal expansion or piezoelectric expansion. By attaching the pillar to the beam and expanding the beam materials, the beam can be bent to actuate the pillar in the direction normal to the membrane.

A preferred method for producing the deformable mirror includes the steps of providing first and second substrates. The first substrate has a bottom surface and a polished top surface. A mask is produced on the bottom surface of the first substrate. The mask defines a membrane pattern and a pillar pattern. The first substrate is then etched to form a membrane and at least one pillar for deforming the membrane. The pillar is integrally formed with the membrane and extends from a bottom surface of the membrane. The method also includes the steps of producing on the second substrate at least one actuating member for actuating the pillar, and mounting the first substrate to the second substrate such that the bottom surface of the membrane faces the second substrate.

An alternative embodiment of the invention presents a deformable mirror formed from a single substrate. The deformable mirror includes a membrane having a bottom surface and a polished top surface. The polished top surface of the membrane forms the mirror surface and is preferably covered with a high reflectance coating, such as alternating layers of $SiO_2$ and $TiO_2$. Alternatively, the high reflectance coating may comprise a layer of gold.

The mirror also includes at least one pad positioned on the bottom surface of the membrane. The pad preferably comprises a piezoelectric material having a different rate of piezoelectric expansion than the membrane so that when a voltage difference is applied across the pad, the pad expands to deform the membrane. Alternatively, the pad may comprise a material having a different thermal expansion coefficient than the membrane so that when the pad is heated, the pad expands to deform the membrane.

A preferred method for producing the deformable mirror includes the steps of providing a substrate having a bottom surface and a polished top surface. A mask is produced on the bottom surface of the substrate. The mask defines a membrane pattern. The substrate is then etched to form a membrane in a top layer of the substrate. The method also includes the step of patterning on a bottom surface of the membrane a material having a different rate of piezoelectric or thermal expansion than the membrane. When a voltage or current is applied to the pad, the pad expands to deform the membrane. Suitable piezoelectric materials include zinc oxide, lead magnesium niobate, and lead zirconate titanate. Suitable thermal expansion materials include aluminum gold and copper.

DETAILED DESCRIPTION

Figure 1:
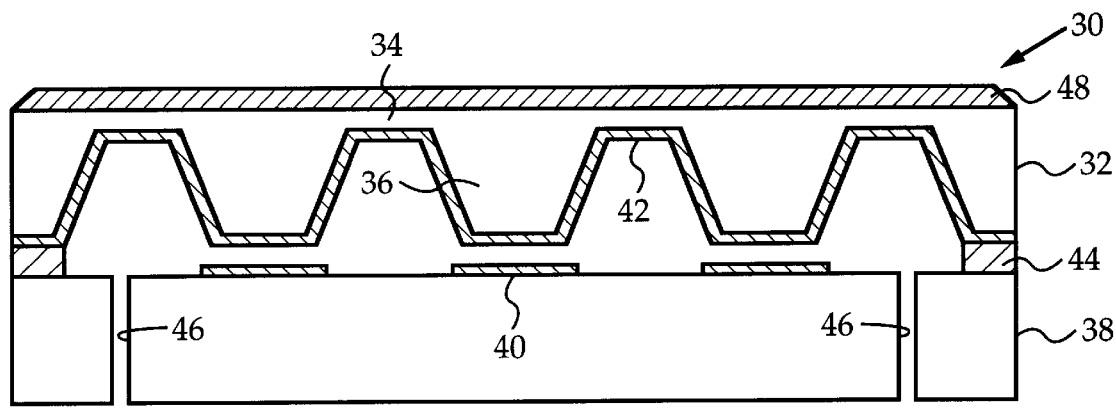
FIG. 1 is a cross sectional view of a deformable mirror according to a first embodiment of the invention.

FIGS. 1–6 illustrate a first embodiment of the invention. Referring to FIG. 1, a deformable mirror 30 according to the first embodiment includes a first substrate 32 and a second substrate 38. The first substrate 32 forms the mirror surface. The first substrate 32 has formed therein a continuous membrane 34 having a bottom surface and a polished top surface. The first substrate 32 also includes pillars 36 for deforming the membrane 34. The pillars 36 are integrally formed with the membrane 34 and extend from its bottom surface.

The second substrate 38 has electrodes 40 positioned thereon for applying an electrostatic force to the pillars 36 to deform the membrane 34. To improve the electrostatic actuation, the pillars 36 and the bottom surface of the membrane 34 are preferably coated with a layer of electrically conductive material 42, such as aluminum. The second substrate 38 also preferably includes air holes 46 to allow the release and intake of air as the membrane 34 deforms.

The first substrate 32 is mounted to the second substrate 38 such that the bottom surface of the membrane 34 faces the second substrate 38 and such that the pillars 36 are aligned with the electrodes 40. In the first embodiment, the first substrate 32 is mounted to the second substrate 38 by placing a spacer layer 44 of photoresist on the second substrate 38. The first substrate 32 is then glued or epoxied to the spacer layer 44. Alternatively, the first and second substrates may be eutectically bonded or fusion bonded, as will be discussed below in subsequent embodiments.

The top surface of the membrane 34 is covered with a high reflectance coating 48. The high reflectance coating preferably comprises alternating layers of at least two dielectric materials having different indexes of refraction. Suitable dielectric materials for this purpose include titania ($TiO_2$) and silica ($SiO_2$). Alternatively, the high reflectance coating 48 may comprise a layer of gold. The membrane 34 preferably has a thickness in the range of 10 to 40 microns. This range is presently preferred because below a thickness of 10 microns the membrane may be too fragile, and above a thickness of 40 microns the membrane may become too stiff to deform in a useful manner.

Figure 2A:
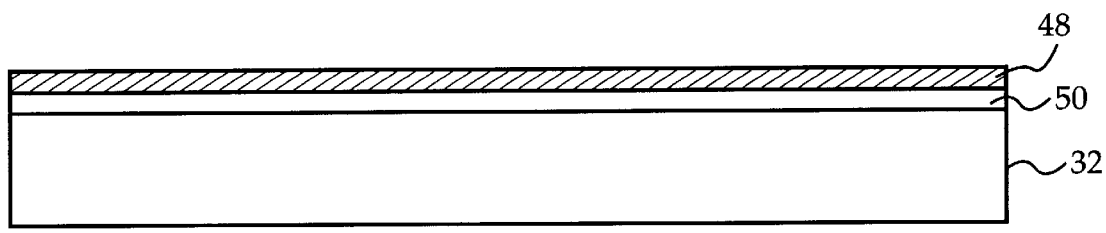
FIGS. 2A–2E are cross sectional views of a first substrate of the deformable mirror of FIG. 1 during various stages of fabrication.

A method for producing the first substrate 32 is illustrated in FIGS. 2A–2E. Referring to FIG. 2A, the first substrate 32 preferably comprises a portion of a single crystal silicon wafer. Single crystal silicon is presently preferred because it can be polished to form a high quality mirror surface. It is to be understood, however, that any type of semi-conductor wafer may be used.

The substrate 32 has a bottom surface and a top surface which is polished to optical quality. Suitable techniques for polishing the surface to optical quality are well known in the art. The substrate 32 also preferably has a doped layer 50 forming its top surface and extending to a depth corresponding to a desired thickness of the membrane. Layer 50 is preferably doped with boron to a concentration greater than $10^{19}/cm^3$ so that subsequent anisotropic etching of the substrate 32 stops on the boron doping. The substrate 32 may be doped with boron using any standard technique, such as epitaxial growth or diffusion doping, as is well known in the art. By controlling the boron doping profile, the thickness of the membrane can be adjusted.

The top surface of the substrate 32 is then covered with the high reflectance coating 48 which preferably comprises alternating layers of $TiO_2$ and $SiO_2$. A suitable method for producing such a coating is described by Thomas in "Single-layer $TiO_2$ and multilayer $TiO_2$—$SiO_2$ optical coatings prepared from colloidal suspensions", Applied Optics, Vol. 26, No. 21, pg. 4688–4691, November 1987. Briefly, the coating method includes the step of laying down quarter-wave thick alternating coats of $TiO_2$ and $SiO_2$ which are prepared from colloidal suspensions of silica. The reflectance coating preferably comprises eight pairs of $TiO_2$—$SiO_2$ layers with a final outside layer of $TiO_2$. Thomas found this seventeen layer coating to have 99% reflectivity at the assigned wavelength.

Figure 2B:
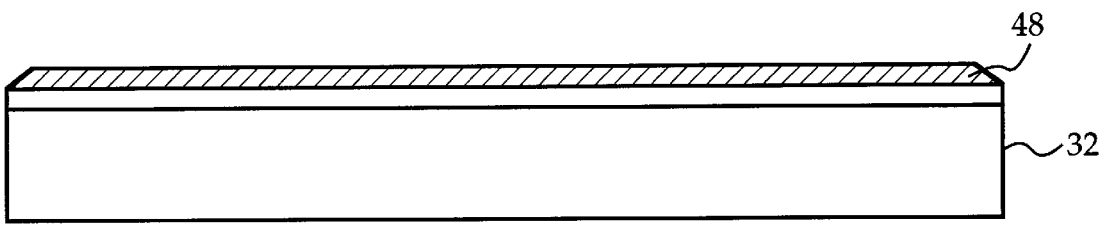

The edges of the reflective coating 48 are then tapered with a hydrofluoric (HF) acid etch. The resulting structure is shown in FIG. 2B. The edges are tapered so that they can be completely sealed under a subsequent coating of masking material. The tapering step may be skipped if the membrane mirror is far enough from the edge of the wafer that the subsequent anisotropic etching will not appreciably etch the coating.

Figure 2C:
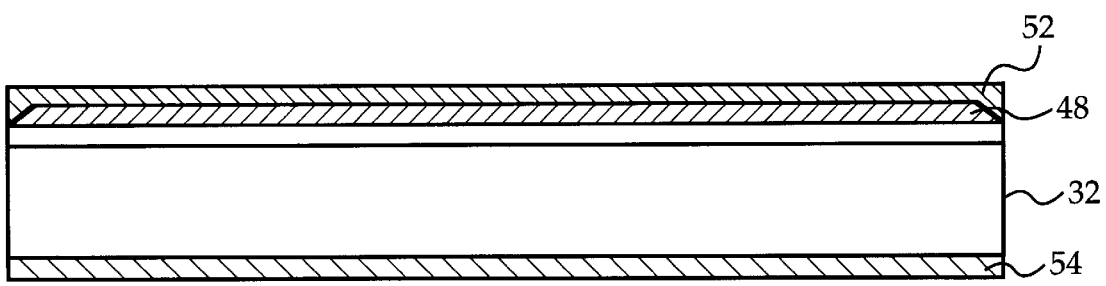

Both sides of the substrate 32 are then covered with a layer of masking material, as shown in FIG. 2C. A top layer 52 of masking material covers the reflectance coating 48 and a bottom layer 54 of masking material covers the bottom surface of the substrate 32. The masking material is preferably silicon nitride, although any suitable masking material, such as silicon dioxide, may also be used.

Figure 2D:
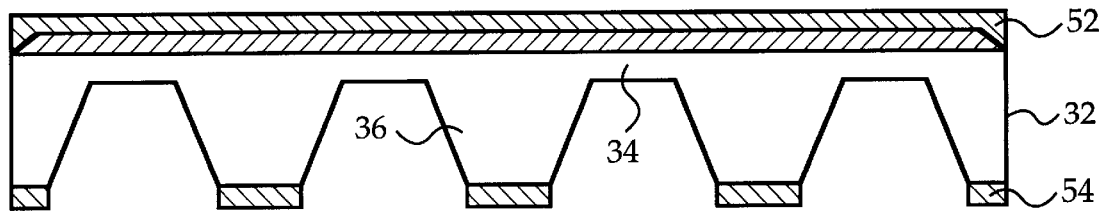
Figure 3:
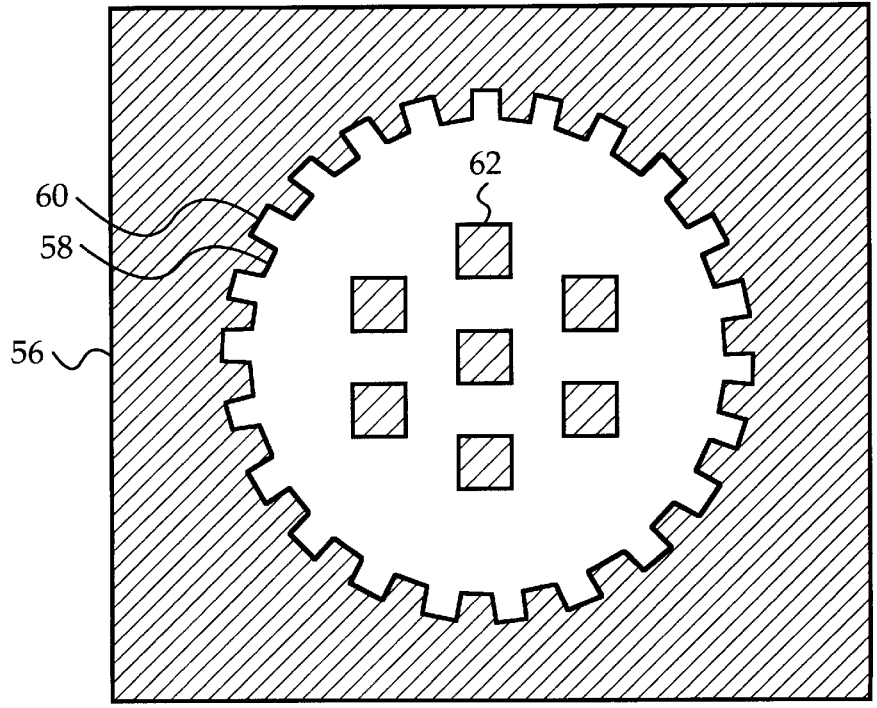
FIG. 3 is a plan view of a mask defining a membrane pattern and a pillar pattern according to a first embodiment of the invention.

Using standard photolithographic techniques, the bottom layer of masking material is then patterned and etched to produce a mask 56 on the bottom surface of the substrate, as shown in FIG. 3. The mask 56 defines a membrane pattern 58 and pillar patterns 62. Referring to FIG. 2D, the substrate 32 is then etched to form the membrane 34 and the pillars 36. The pillars 36 are integrally formed with the membrane 34 and extend from the bottom surface of membrane 34.

The membrane 34 and the pillars 36 are preferably formed by anisotropically etching the substrate 32 using either potassium hydroxide (KOH) or tetramethyl ammonium hydroxide (TMAH). The anisotropic etching advantageously terminates on the doped layer so that the thickness of the membrane 34 may be precisely controlled. By etching the substrate 32 along the (411) crystallographic planes, the pillars 36 are formed with sidewalls which form an angle of 76.4 degrees with respect to the surface of the membrane 34. Alternatively, the substrate 32 may be etched along the (110) crystallographic planes to form pillars with sidewalls which are orthogonal to the membrane. Deep reactive ion etching may also be used to make the sidewalls orthogonal to the membrane.

Referring again to FIG. 3, the pillar patterns 62 are preferably spaced at least 1 mm from each other to produce pillars having a spacing of at least 1 mm. Additionally, the pillar patterns 62 are preferably squares having sides in the range of 400 to 600 microns. The membrane pattern 58 preferably includes outer teeth 60 which provide for the formation of a circular membrane. During etching of the substrate, the anisotropic etchant undercuts the teeth 60 to form a circular aperture in the substrate. The teeth 60 preferably have dimensions equal to the thickness of the substrate, e.g. 350 microns or 500 microns for standard wafer thicknesses of 350 microns and 500 microns, respectively.

Figure 2E:
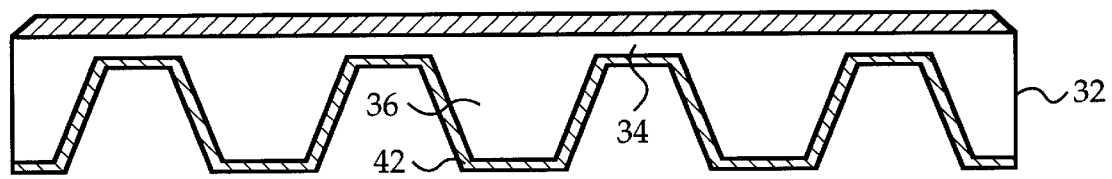

Following the etching of the substrate 32, the layers 52 and 54 of masking material are removed. The pillars 36 and the bottom surface of the membrane 34 are then covered with a layer of electrically conductive material 42, preferably aluminum. This may be accomplished using any standard technique, such as chemical vapor deposition (CVD), evaporation, or sputtering. The layer of electrically conductive material 42 preferably has a thickness of about 100 nm. The resulting structure of the substrate 32 is shown in FIG. 2E.

Figure 4A:
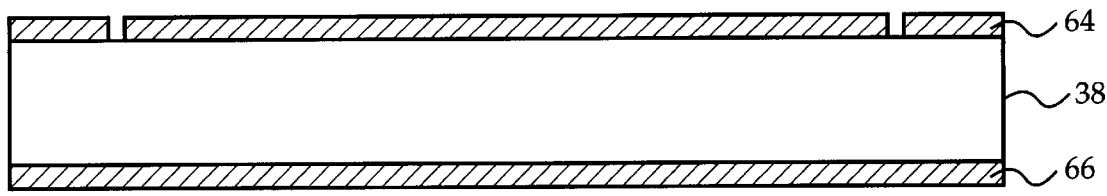
FIGS. 4A–4D are cross sectional views of a second substrate of the deformable mirror of FIG. 1 during various stages of fabrication.

A method for producing the second substrate 38 is illustrated in FIGS. 4A–4D. Referring to FIG. 4A, the second substrate 38 preferably comprises a portion of a single crystal silicon wafer. Alternatively, any type of semiconductor wafer may be used. It is also noted that the second substrate may simply comprise a printed circuit board onto which the electrodes 40 are patterned.

Both sides of the substrate 38 are covered with a layer of masking material. A top layer 64 of masking material covers the top surface and a bottom layer 64 of masking material covers the bottom surface. The masking material is preferably silicon nitride, although any suitable masking material, such as silicon dioxide, may also be used.

Figure 4B:
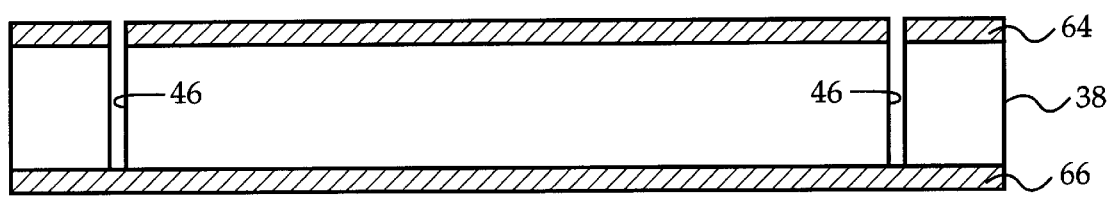
Figure 4C:
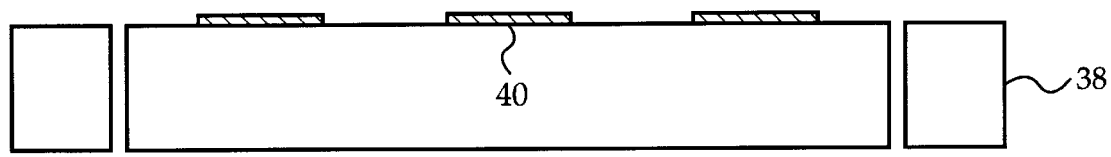

Using standard photolithographic techniques, the top layer 64 of masking material is then patterned and etched to produce a mask on the top surface of the substrate 38. The mask defines an air hole pattern. Referring to FIG. 4B, the substrate 38 is then etched to form the air holes 46. The air holes 46 may be formed by anisotropically etching the substrate 38 using KOH or TMAH. Alternatively, deep reactive ion etching may be used to form the air holes 46. Following the etching of the substrate 38, the layers 64 and 66 of masking material are removed. The electrodes 40 are then patterned on the substrate 38, as shown in FIG. 4C.

Figure 5:
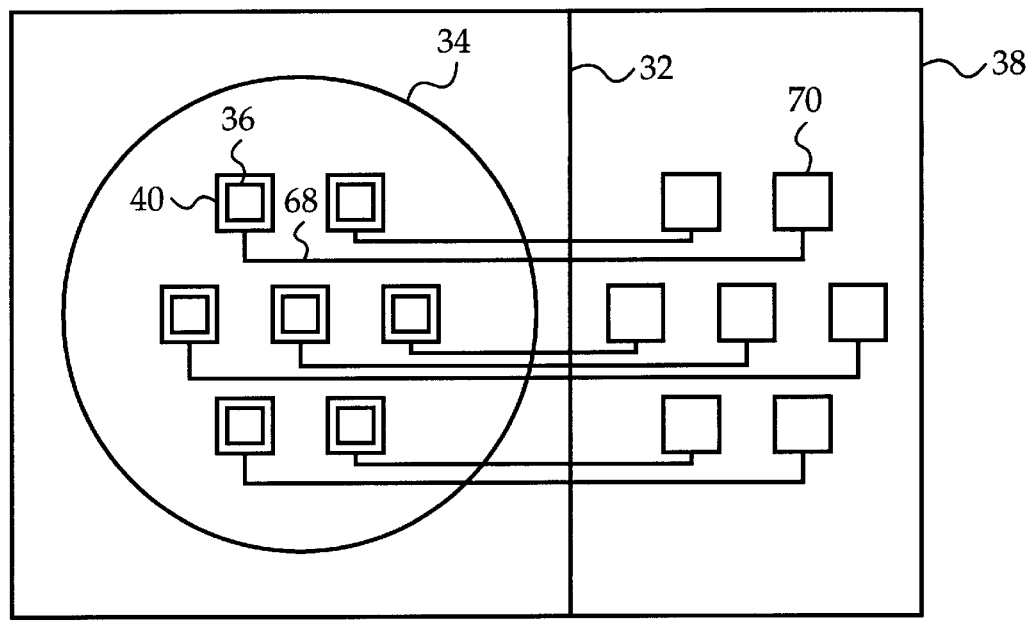
FIG. 5 is a schematic plan view of the deformable mirror of FIG. 1.

FIG. 5 shows a top plan view of the substrate 38. Each electrode 40 is preferably connected to a respective bond pad 70 by a corresponding trace 68. The electrodes 40, traces 68, and bond pads 70 may be formed on substrate 38 by first spinning a layer of photoresist onto the top surface of substrate 38 and then patterning the photoresist using conventional photolithographic techniques. The photoresist is etched to form a desired pattern for the electrodes 40, traces 68, and bond pads 70. An electrically conductive material, preferably gold or aluminum, is then evaporated or sputtered onto the top surface of the substrate 38 to form the electrodes, traces, and bond pads. The photoresist and undesired portions of the evaporated material are then removed from the substrate 38 by placing the wafer in acetone or a similarly suitable solvent.

Figure 4D:
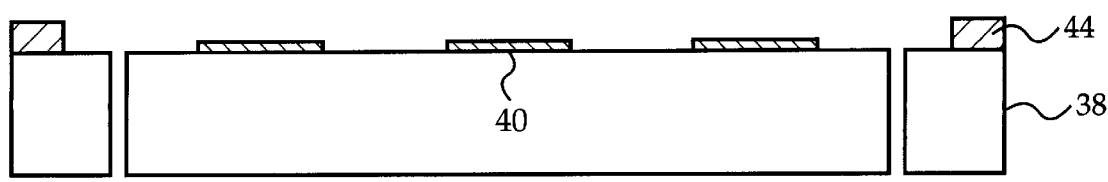

Referring to FIG. 4D, a spacer layer 44 of photoresist is then formed on the top surface of the substrate 38. The spacer layer 44 preferably has a thickness in the range of 2 to 10 microns. The first substrate 32 is then mounted to the second substrate 38 such that the pillars 36 are aligned with the electrodes 40, as shown in cross section in FIG. 1 and in plan view in FIG. 5.

In operation, the membrane 34 is deformed in a controlled fashion by applying voltages to the bond pads 70. The voltages create electrostatic forces between the pillars 36 and electrodes 40, thus actuating the pillars 36 in a direction normal to the membrane 34.

One advantage of the deformable mirror described in the first embodiment is that the substrate which forms the mirror surface is polished to optical quality and covered with a high reflectance coating before it is etched. This ensures that the membrane has a high quality reflective surface. Another advantage is that the influence of the electrostatic electrodes is limited to the tips of the pillars which are in turn integrally formed with the membrane, providing improvements in influence function. A third advantage is that the production of the mirror is completely mass fabrication compatible. Multiple mirrors may be micromachined from the same wafer, allowing for the inexpensive production of high quality deformable mirrors.

Several deformable mirrors were built with 10 micron thick membranes using the methods described in the first embodiment. The first mirror had a membrane 1 cm in diameter and included a single electrode behind an array of seven pillars. The top of each pillar had a width of about 500 microns and the pillars were arranged in a hexagonal pattern with a spacing of 2.05 mm between adjacent pillars. This first mirror was built as a focus corrector. A second mirror had a membrane 1.8 cm in diameter and included an array of seven electrodes behind an array of seven pillars arranged in a hexagonal pattern with a spacing of 4.1 mm between adjacent pillars.

Figure 6:
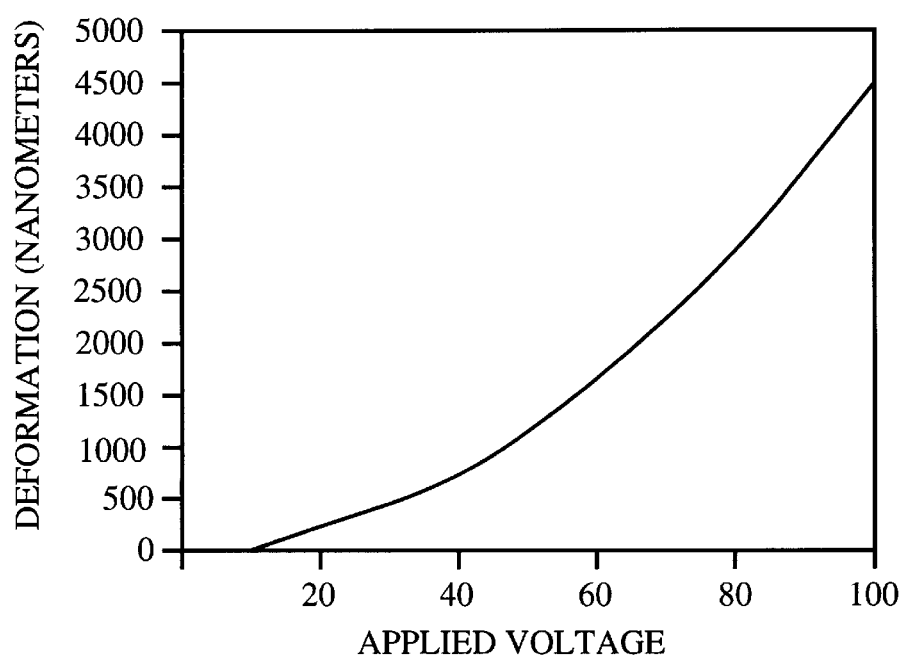
FIG. 6 is a graph showing the predicted deformation of the mirror of FIG. 1 as a function of applied voltage.

The response of both mirrors was tested with a Shack-Hartmann wavefront sensor. The response of the first mirror is shown in FIG. 6. The deformation with respect to applied voltage followed a parabolic dependence given by the equation:

$$y=0.4922x^2-5.0077x+80.497$$

where y is equal to the deformation of the membrane in nanometers and x is equal to the applied voltage in volts. The radius of curvature measured with the Shack-Hartmann wavefront sensor was −3.9 m at 100V.

The seven electrode deformable mirror was tested using a direct reflection off the mirror at about 5 degrees and 3× telescope to reduce the membrane image to fit into the sensor. The influence functions of this mirror were characterized by applying 155V to each of the electrostatic pads. Each of the six pillars positioned 4.1 mm from the center moved approximately 125 nm and the center pillar created a 190 nm phase deviation. Using the typical parabolic response, 310V would create a phase deviation of 500 nm at the edges. The amplitude of the influence function of the six surrounding pillars at 4.1 mm from the center was 71 nm corresponding to adjacent channel coupling of 57%. The spacing required to get 15% coupling was 7 mm.

The temporal response was measured for a variety of membranes with a square wave going from 0 to 100V. The step response measured in room air of the first mirror having a 1 cm diameter, 10 micron thick membrane showed ringing at a frequency of 950 Hz. The step response of a 1 cm diameter, 30 micron thick membrane exhibited a resonant frequency of 2.7 KHz corresponding to a phase deviation of 550 nm. A membrane 1.8 cm in diameter and 30 microns thick had a resonant frequency of 1.02 KHz.

Several mirrors were also built to test power handling capability. Mirrors built with membranes having a thickness of 20 microns and 30 microns were coated with 100 nm of gold for reflectivity. The power handling capability was tested by putting 1064 nm laser light onto the surface of each membrane in a 50 micron spot. Two different membranes were tested and each withstood 8 W of continuous wave (CW) power for 10 minutes. This corresponds to an intensity of more than 100 kW/cm$^2$.

Figure 7:
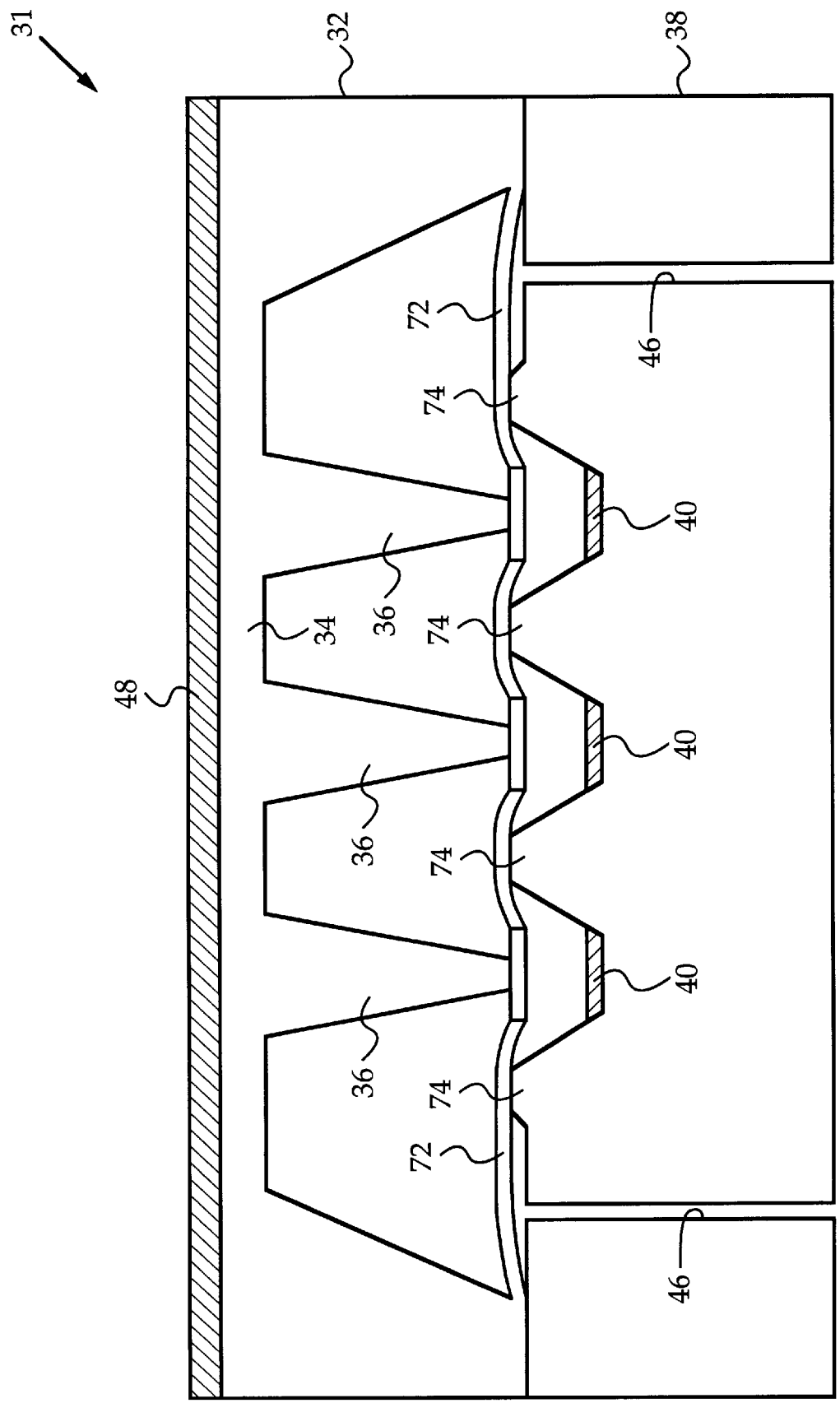
FIG. 7 is a cross sectional view of a deformable mirror according to a preferred embodiment of the invention.

FIGS. 7–12 illustrate a deformable mirror 31 according to a second embodiment of the invention. As shown in FIG. 7, the deformable mirror 31 is similar to the deformable mirror of the first embodiment in that it includes a first substrate 32 which forms the mirror surface and a second substrate 38 which has electrodes 40 for actuating the pillars 36. Unlike the mirror of the first embodiment, however, the first substrate 32 includes supporting members 72 which are arranged in a grid-like network in the bottom layer of the substrate 32, preferably a boron doped layer. The supporting members 72 are attached to the bottom portions of the pillars 36.

Also in the second embodiment, the second substrate 38 includes pushing members or pushing pillars 74 for mechanically pushing the supporting members 72 to provide an initial displacement of the membrane 34. The supporting members 72 and pushing pillars 74 thus allow the membrane 34 to be initially displaced by a distance equal to the height of the pushing pillars 74, preferably 1 to 5 microns.

Figure 8A:
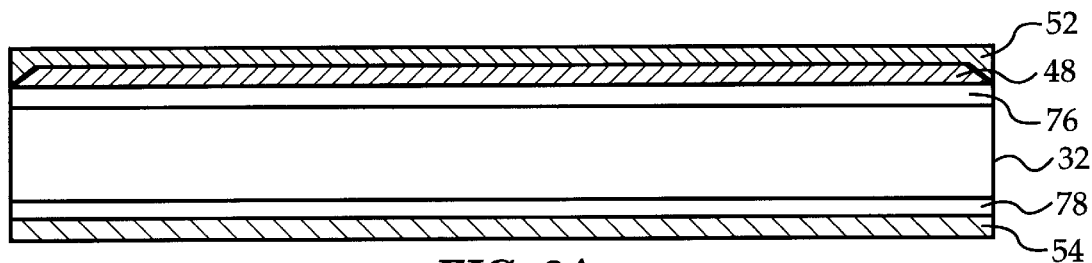
FIGS. 8A–8D are cross sectional views of a first substrate of the deformable mirror of FIG. 7 during various stages of fabrication according to a preferred method of the invention.

FIGS. 8A–8D illustrate a preferred method for producing the first substrate 32 according to the second embodiment. Referring to FIG. 8A, the first substrate 32 preferably comprises a portion of a single crystal silicon wafer. The substrate 32 has a first boron doped layer 76 forming its top surface and extending to a depth corresponding to a desired thickness of the membrane. The first substrate also includes a second boron doped layer 78 forming its bottom surface. The second doped layer 78 is etched to form the bottom portion of the pillars and the grid-like network of supporting members, as will be explained in detail below. Doped layer 78 preferably has a thickness in the range of 2 to 10 microns.

As in the first embodiment, the substrate 32 has a bottom surface and a top surface which is polished to optical quality. The top surface of the substrate 32 is covered with a high reflectance coating 48 and the edges of the coating 48 are tapered with a HF acid etch, as previously described with reference to FIGS. 2A–2B. The coating 48 is then covered with a layer of masking material 52, preferably silicon nitride. A layer of masking material 54, preferably photoresist, is also placed on the bottom surface of the substrate 32.

Figure 10:
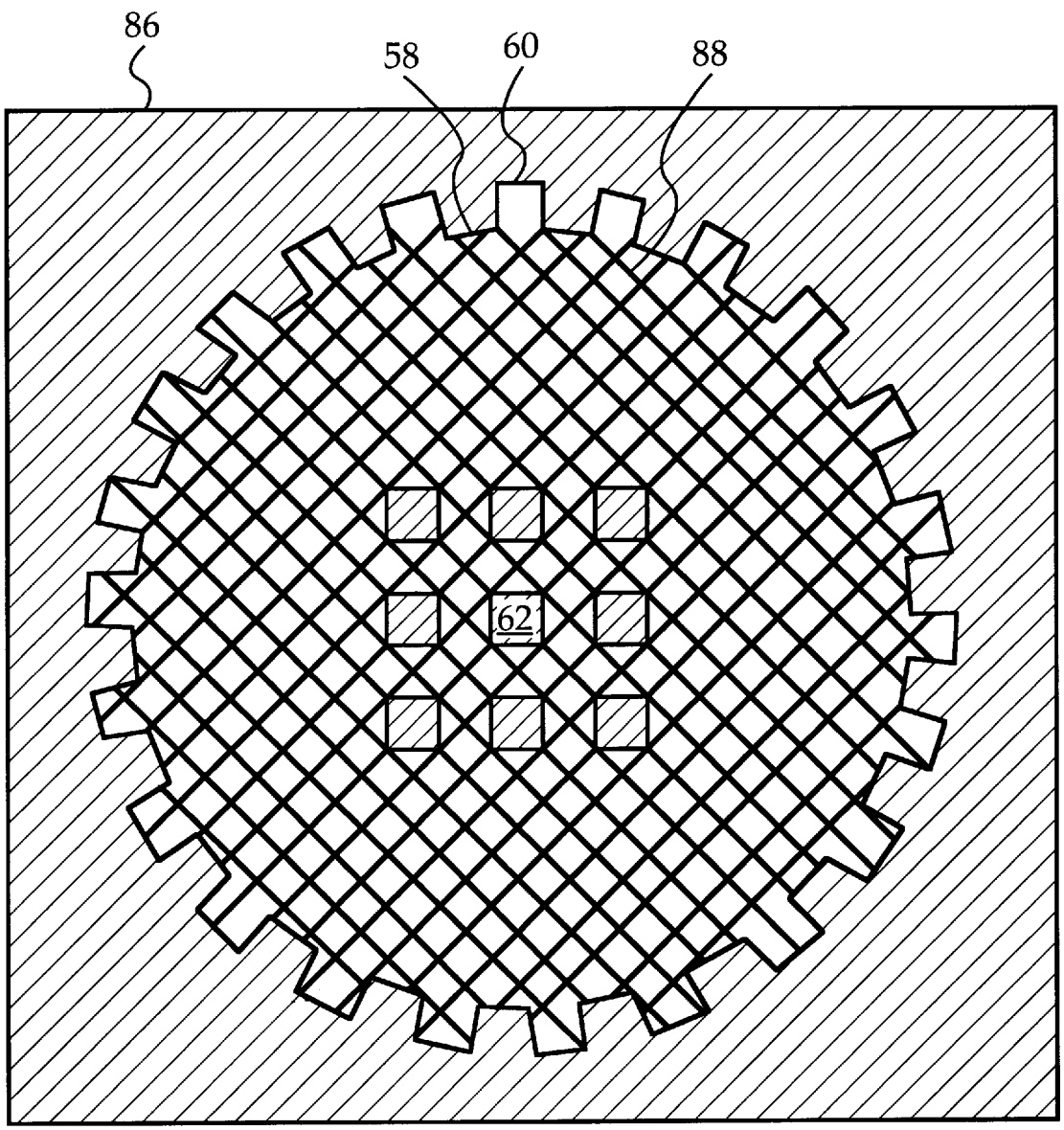
FIG. 10 is a plan view of a mask defining a membrane pattern and a pillar pattern according to the preferred embodiment of the invention.

Using standard photolithographic techniques, the bottom layer of masking material 54 is patterned to produce a mask 86 on the bottom surface of the substrate, as shown in FIG. 10. The mask 86 defines a membrane pattern 58 and pillar patterns 62. As in the first embodiment, the membrane pattern 58 preferably includes teeth 60 to form a circular membrane. Unlike the first embodiment, however, the mask 86 also includes a grid pattern 88 for forming the supporting members in the bottom layer of the substrate. Each grid line is preferably about 140 microns in width and forms an angle of 45 degrees with respect to the major flat of the wafer. The pillar patterns 62 are preferably squares having sides in the range of 400 to 600 microns.

Figure 8B:
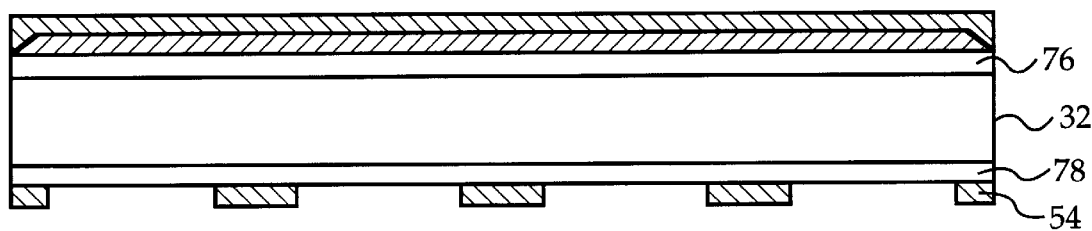
Figure 8C:
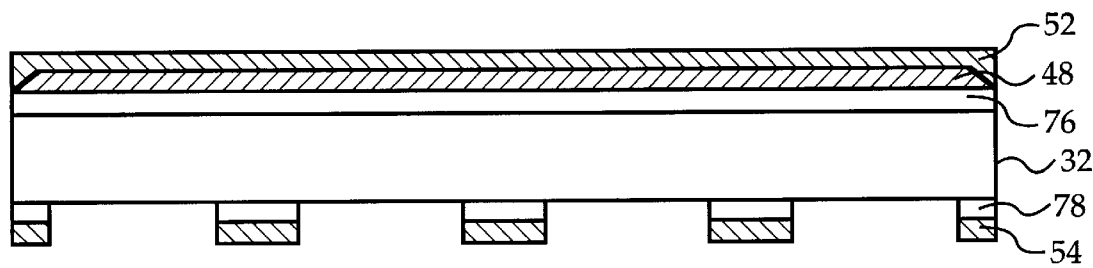

Referring to FIG. 8B, the substrate 32 is then etched through the mask to transfer the membrane pattern, pillar pattern, and grid pattern into the doped layer 78. The patterns are preferably transferred into the doped layer using a plasma etch. The resulting structure of the substrate 32 is shown in FIG. 8C.

Figure 8D:
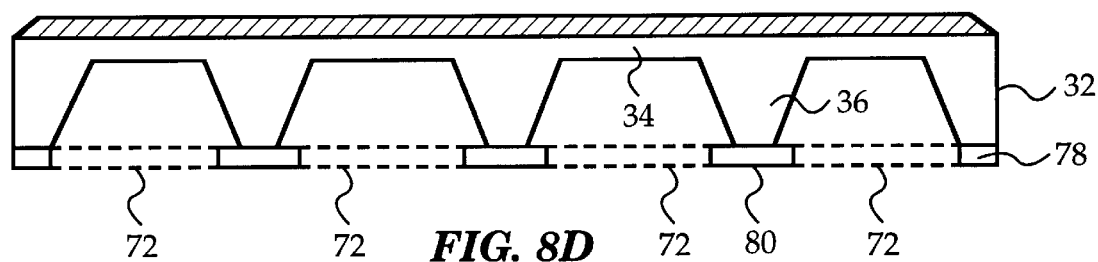

The first substrate 32 is then etched through the doped layer 78 to form the membrane 34, pillars 36, and supporting members 72, as shown in FIG. 8D. The supporting members 72 are formed integrally with the bottom portions of the pillars 36 in the doped layer 78. The membrane 34, pillars 36, and support members 72 are preferably formed by anisotropically etching the substrate 32 through the doped layer 78 using KOH or TMAH. The anisotropic etching advantageously terminates on the first doped layer 76 so that the thickness of the membrane 34 may be precisely controlled. Following the etching of the substrate 32, the layers 52 and 54 of masking material are removed, and the bottom surface of the doped layer 78 is preferably coated with an electrically conductive material, such as gold or a gold/tin alloy.

Figure 9A:
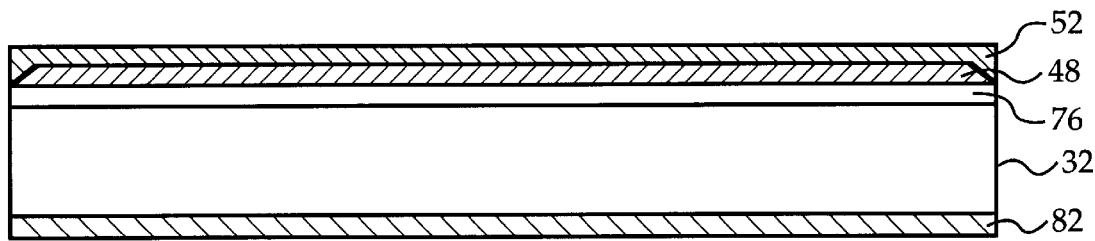
FIGS. 9A–9D are cross sectional views of a first substrate of the mirror of FIG. 7 during various stages of fabrication according to an alternative method of the invention.

FIGS. 9A–9D illustrate an alternative method for producing the first substrate 32. Referring to FIG. 9A, the first substrate 32 has a boron doped layer 76 forming its top surface and extending to a depth corresponding to a desired thickness of the membrane. As in the previous embodiment, the top surface of the substrate 32 is covered with a high reflectance coating 48 and the edges of the coating 48 are tapered with a HF acid etch. The coating 48 is then covered with a layer of masking material 52, preferably silicon nitride.

A layer of silicon dioxide 82 is placed on the bottom surface of the substrate 32. The layer of silicon dioxide 82 is etched to form the bottom portion of the pillars and the grid-like network of supporting members. The silicon dioxide layer 82 is preferably 2 to 10 microns thick and may be placed on the substrate using any well known technique, such as thermal growth, CVD, or evaporation.

Figure 9B:
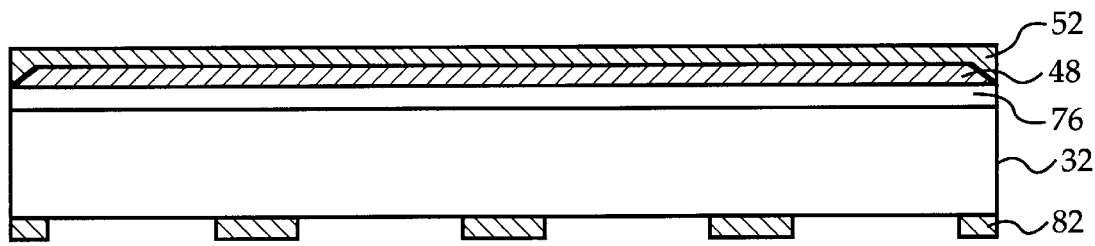
Figure 9C:
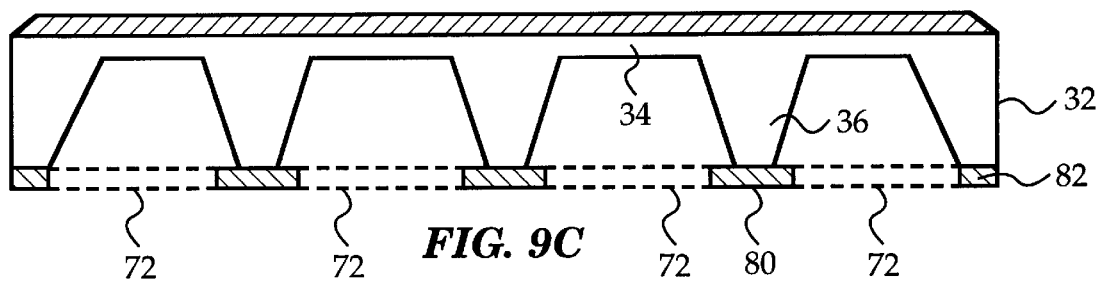
Figure 9D:
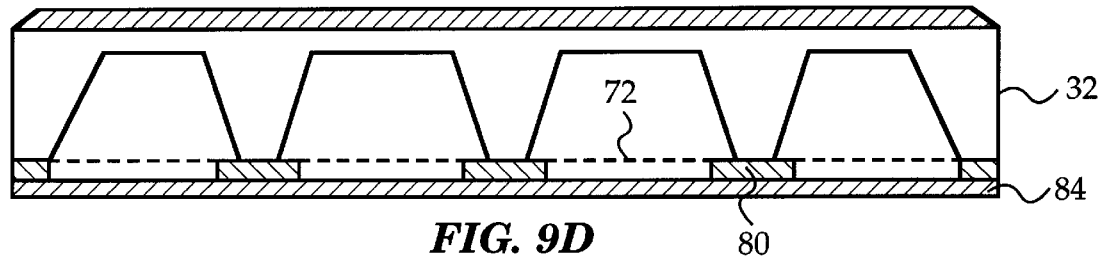

Using standard photolithographic techniques, the silicon dioxide layer 82 is patterned to produce the mask 86 on the bottom surface of the substrate, as shown in FIG. 10. Referring to FIGS. 9B–9C, the substrate 32 is then etched through the mask to form the membrane 34, pillars 36, and supporting members 72. The supporting members 72 are formed integrally with the bottom portions 80 of the pillars in the silicon dioxide layer 82.

The membrane 34, pillars 36, and support members 72 are preferably formed by anisotropically etching the substrate 32 using KOH or TMAH. The anisotropic etching advantageously terminates on the doped layer 76 so that the thickness of the membrane 34 may be precisely controlled. Following the etching of the substrate 32, the layer 52 of masking material is removed, and the bottom surface of silicon dioxide layer 82 is preferably coated with an electrically conductive material 84, such as gold or a gold/tin alloy.

Figure 11A:
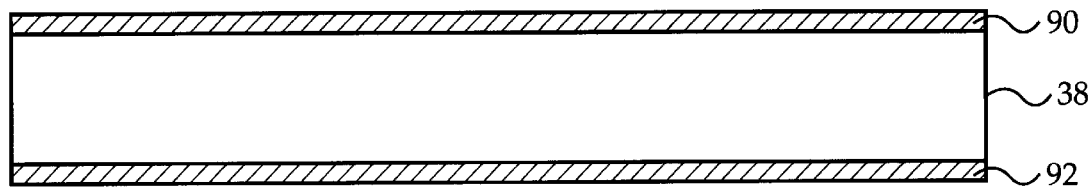
FIGS. 11A–11G are cross sectional views of a second substrate of the deformable mirror of FIG. 7 during various stages of fabrication.

FIGS. 11A–11G illustrate a preferred method for producing the second substrate 38 according to the second embodiment. Referring to FIG. 11A, the second substrate 38 preferably comprises a portion of a single crystal silicon wafer. The top surface of the substrate 38 is covered with a layer of masking material 90, preferably silicon nitride. The bottom surface of the substrate 38 is also covered with a layer of masking material 92, preferably silicon nitride.

Figure 11B:
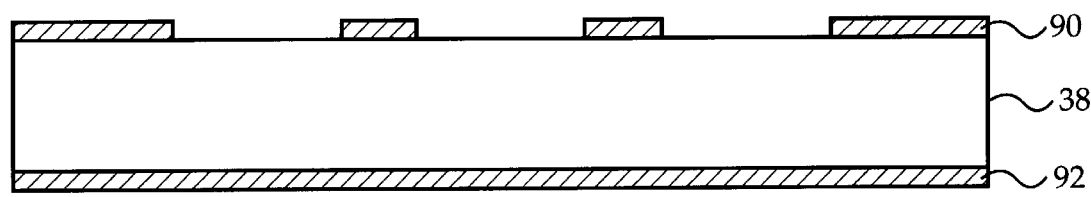
Figure 11C:
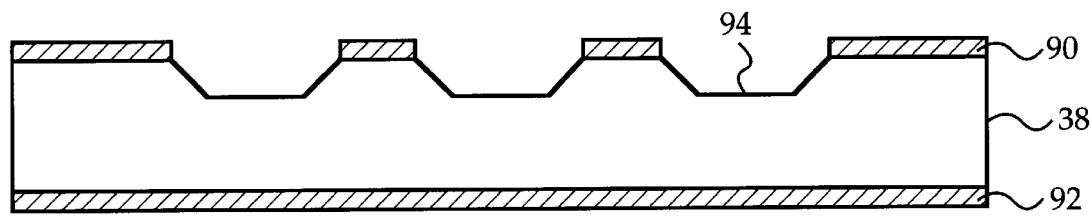

Using standard photolithographic techniques, the top layer of masking material 90 is patterned and etched to produce a mask on the top surface of the substrate 38, as shown in FIG. 11B. The mask defines an electrode pit pattern. Referring to FIG. 11C, the substrate 38 is then etched through the mask to form initial electrode pits. The substrate is preferably anisotropically etched to a depth of 2 to 10 microns with a preferred depth of 7 microns using KOH or TMAH.

Figure 11D:
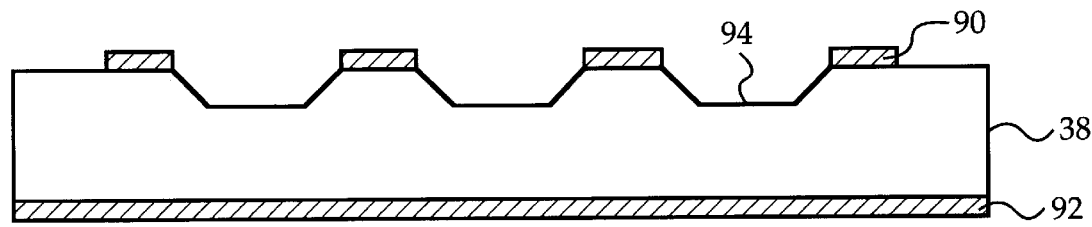
Figure 11E:
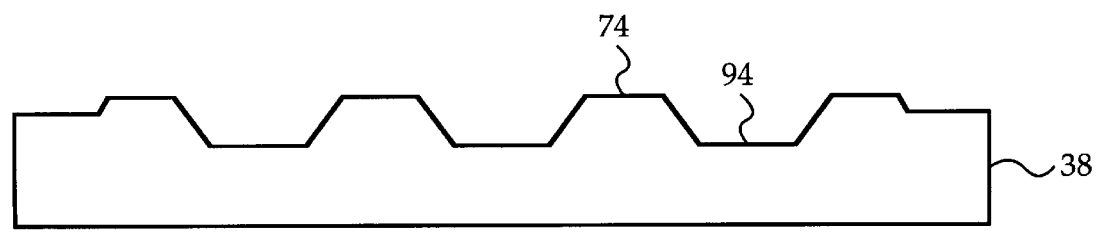

Referring to FIG. 11D, the top layer of masking material 90 is further patterned and etched using standard lithographic techniques to produce another mask on the top surface of the substrate 38. The second mask defines a pushing pillar pattern. Referring to FIG. 11E, the substrate 38 is then etched through the second mask to form the pushing pillars 74 and to increase the depth of the electrode pits. The substrate is preferably anisotropically etched to a depth of 1 to 5 microns with a preferred depth of 3 microns using KOH or TMAH. Following the etch, the layers of masking material 90 and 92 are removed.

Figure 11F:
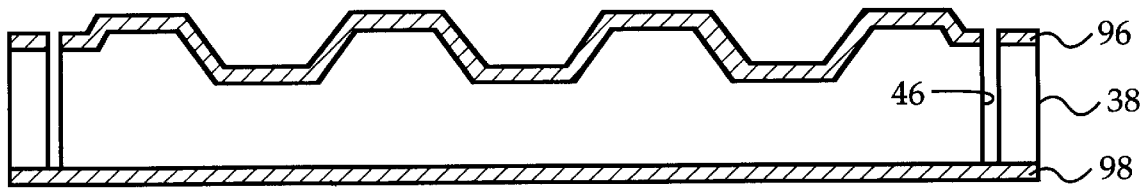
Figure 11G:
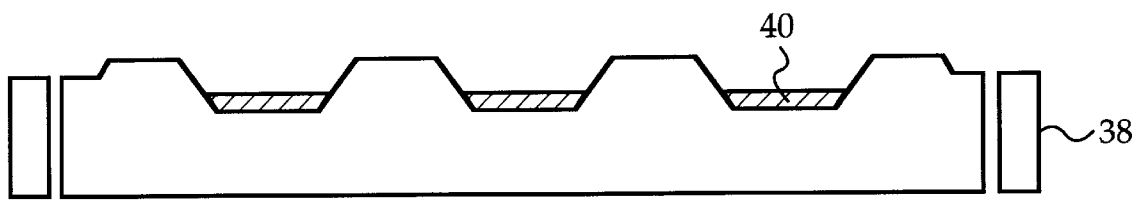

As shown in FIG. 11F, the top surface of the substrate 38 is then covered with a layer of masking material 96 and the bottom surface of the substrate is covered with a layer of masking material 98. The top layer of masking material 96 is patterned and etched to form a third mask defining an air hole pattern. The substrate 38 is then etched through the third mask to form the air holes 46, preferably by anisotropic etching or deep reactive ion etching. Following the etching of the air holes, the layers of masking material 96 and 98 are removed. An electrically conductive material, preferably gold or aluminum, is then patterned into the electrode pits to form the electrodes 40, as shown in FIG. 11G.

Figure 12:
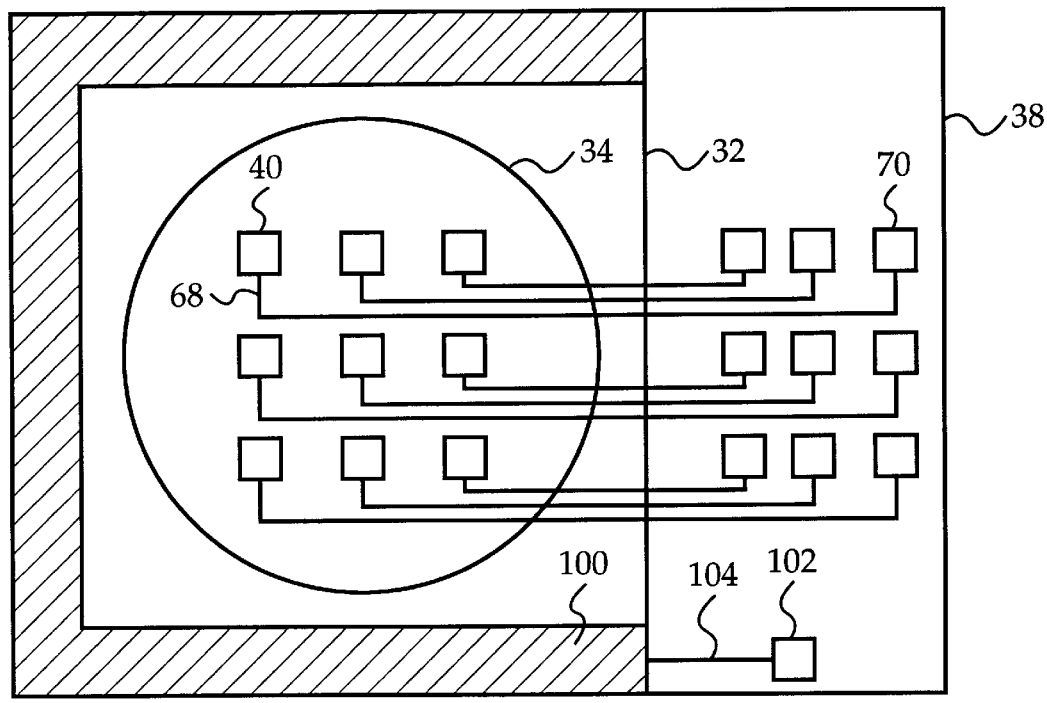
FIG. 12 is a schematic plan view of the deformable mirror of FIG. 7.

FIG. 12 shows a plan view of the substrate 38. Each electrode 40 is preferably connected to a respective bond pad 70 by a corresponding trace 68. The electrodes 40, traces 68, and bond pads 70 may be formed on substrate 38 by first spinning a layer of photoresist onto the top surface of substrate 38 and then patterning the photoresist to form a desired pattern for the electrodes 40, traces 68, and bond pads 70. An electrically conductive material, preferably gold or aluminum, is then evaporated or sputtered onto the top surface of the substrate 38 to form the electrodes, traces, and bond pads. The photoresist and undesired portions of the evaporated material are then removed from the substrate 38 by placing the wafer in acetone or a similarly suitable solvent.

If the bottom surface of the first substrate 32 is coated with gold or a gold/tin alloy, the first substrate 38 may be eutectically bonded to the top surface of the second substrate 38. Alternatively, if the bottom layer of the first substrate 32 is a highly doped boron layer, the step of coating the bottom surface of the substrate 32 with gold may be eliminated, and the bottom surface of substrate 32 may be silicon fusion bonded to the top surface of the second substrate 38. In either case, the bottom surface of first substrate 32 is electrically conductive.

The hatched region 100 in FIG. 12 shows the area in which the electrically conductive bottom surface of the first substrate 32 is bonded to the top surface of the second substrate 38. The second substrate 38 has formed thereon a bond pad 102 and a trace 104 connecting the bond pad 102 to the bonded area 100. The bond pad 102 and trace 104 are preferably formed concurrently with the electrodes 40, traces 68, and bond pads 70.

Referring again to FIG. 7, the first substrate 32 is bonded to the second substrate 38 such that the pushing pillars 74 mechanically push against the supporting members 72 to provide an initial displacement of the membrane. The amount of the initial displacement is determined by the height of the pushing pillars 74 and is preferably about three microns. In operation, the membrane is first leveled to a horizontal orientation by biasing the electrically conductive bottom surface of the substrate 32 with sufficient voltage, typically 100 to 300V in dependence upon the amount of initial displacement and the arrangement of the pillars.

Referring again to FIG. 12, the bottom surface of the substrate 32 is biased with a voltage by applying the voltage to the bond pad 102. Once the membrane 34 is leveled to a horizontal orientation, the membrane 34 is deformed in a controlled fashion by applying incremental voltages to the bond pads 70. The voltages create incremental electrostatic forces between the pillars 36 and electrodes 40, thus actuating the pillars 36 in a direction normal to the membrane 34.

The advantage of initially displacing the membrane and subsequently leveling the membrane with a bias voltage is that it allows the membrane to be deformed using much smaller incremental voltages. Referring again to the graph of FIG. 6, the deformation of the membrane increases in a parabolic fashion as a function of applied voltage. Thus, if the pillars are initially biased with 100V, only an incremental 10V need be applied to bond pads 70 to induce a full micron of deformation in the mirror. Because only a small incremental voltage is required, the deformable mirror may be operated by small electronic devices, such as a personal computer.

Figure 13:
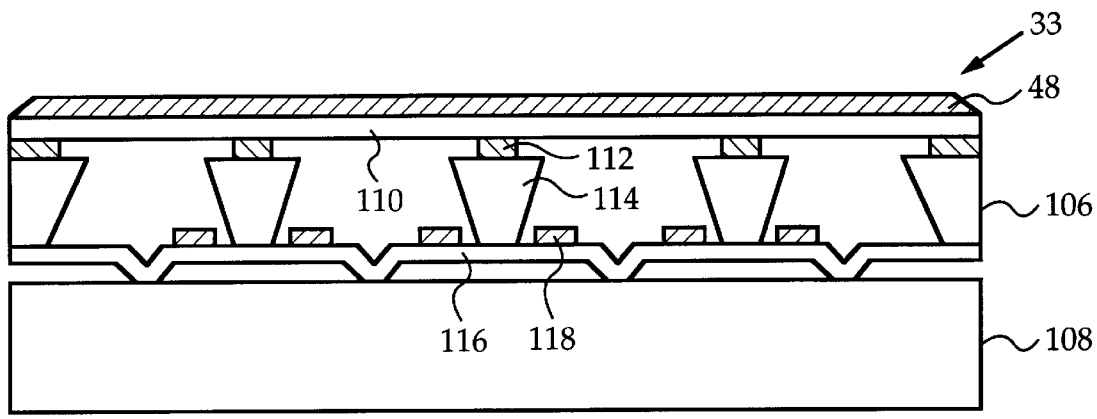
FIG. 13 is a cross sectional view of a deformable mirror according to a third embodiment of the invention.

FIGS. 13–17 show a deformable mirror 33 according to a third embodiment of the invention. Referring to FIG. 13, the deformable mirror 33 includes a first substrate 106 bonded to a second substrate 108. The first substrate 106 forms the mirror surface and has formed therein a continuous membrane 110 having a bottom surface and a polished top surface. The first substrate 106 also includes pillars for deforming the membrane 110. The pillars are integrally formed with the membrane 110 and extend from its bottom surface.

In the third embodiment, the first substrate 106 is a portion of a silicon-on-insulator (SOI) wafer, and each pillar includes a top portion 112 formed from an insulating layer of the SOI wafer and a bottom portion 114 formed from a single crystal silicon layer of the SOI wafer. In addition, the top portion 112 is preferably etched until it is thinner than the bottom portion 114. This minimizes the contact area between each pillar and the membrane 110, allowing for a more ideal influence function and a higher actuator density. The top portion 112 of each pillar is preferably etched to a thickness in the range of 10 to 50 microns.

The second substrate 108 has formed thereon actuator beams for actuating the pillars. The bottom portion 114 of each pillar is bonded to a respective one of the beams. Each beam comprises a first material 116 and a second material 118. The materials 116 and 118 have different coefficients of thermal expansion or different rates of piezoelectric expansion. By expanding the beam materials at different rates due to thermal expansion or piezoelectric expansion, the beams may be bent, thus actuating the pillars in a direction normal to the membrane 110. The first beam material 116 is preferably polycrystalline silicon. If piezoelectric expansion is used, the second beam material 118 is preferably zinc oxide. If thermal expansion is used, the second beam material 118 is preferably aluminum.

Figure 14A:
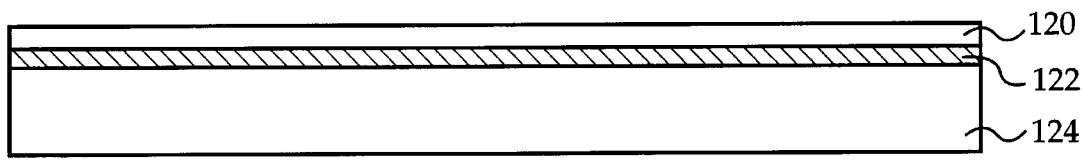
FIGS. 14A–14E are cross sectional views of a first substrate of the deformable mirror of FIG. 13 during various stages of fabrication.

A method for producing the first substrate 106 is illustrated in FIGS. 14A–14E. Referring to FIG. 14A, the first substrate preferably comprises a portion of a SOI wafer having a thin layer 120 of silicon on top of an insulating layer 122, typically silicon dioxide, all on a thick silicon layer 124. Such SOI wafers are widely commercially available. The top layer 120 forms the membrane 110 and preferably has a thickness in the range of 10 to 40 microns.

Figure 14B:
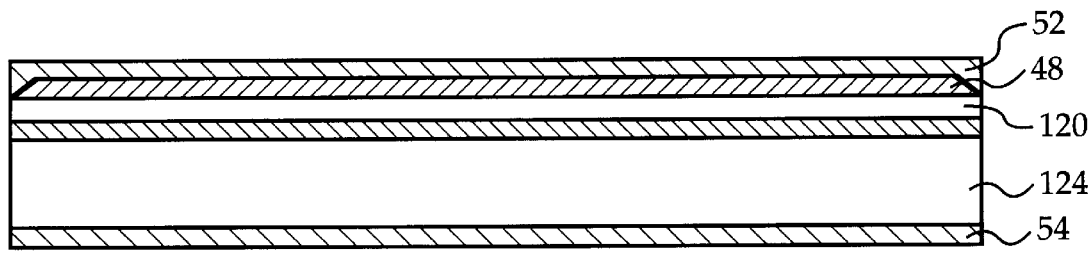

As in the first embodiment, the top surface of the substrate is polished to optical quality, covered with a high reflectance coating 48, and sealed with a layer 52 of masking material, as shown in FIG. 14B. The bottom surface of the substrate is also covered with a layer 54 of masking material. The masking material is preferably silicon nitride, although any suitable masking material, such as silicon dioxide, may also be used.

Figure 14C:
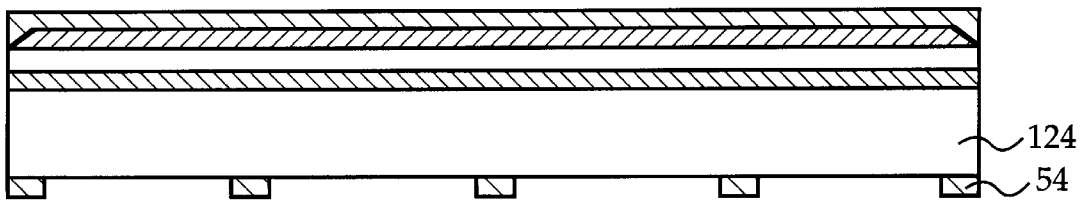
Figure 14D:
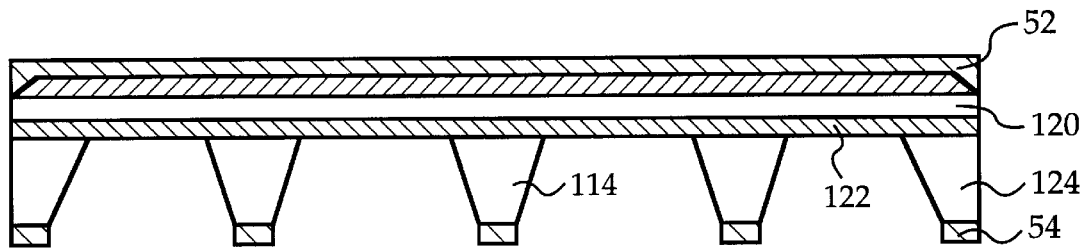

Using standard photolithographic techniques, the bottom layer 54 of masking material is then patterned and etched to produce a mask 56 on the bottom surface of the substrate, as shown in FIGS. 3 and 14C. Referring to FIG. 14D, the substrate is then etched to form the bottom portions 114 of the pillars. The substrate is preferably anisotropically etched using either KOH or TMAH. The anisotropic etching advantageously terminates on the insulating layer 122 so that the thickness of the membrane may be precisely controlled.

Figure 14E:
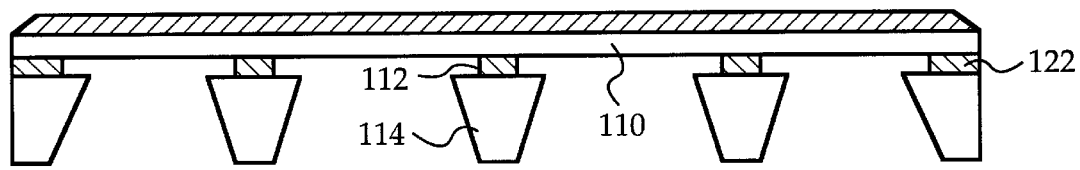

As shown in FIG. 14E, the insulating layer 122 is then etched to release the membrane 110 and to thin the top portions 112 of the pillars. The insulating layer 122 is preferably etched in diluted HF until each top portion 112 has a diameter in the range of 10 to 50 microns. Following the etching of the insulating layer 122, the layers 52 and 54 of masking material are removed. It will be apparent to one skilled in the art that the method of forming the first substrate using an SOI wafer may also be applied to the fabrication of the electrostatically deformable mirrors described in the previous embodiments.

Figure 15A:
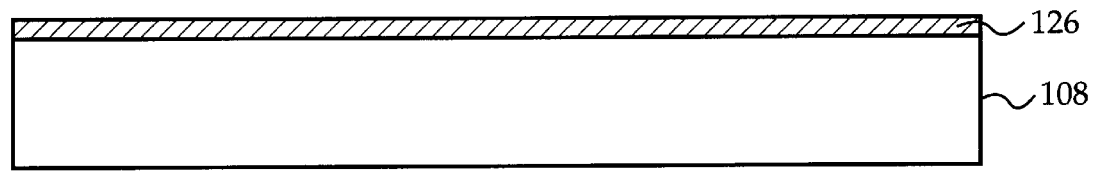
FIGS. 15A–15F are cross sectional views of a second substrate of the deformable mirror of FIG. 13 during various stages of fabrication.
Figure 15B:
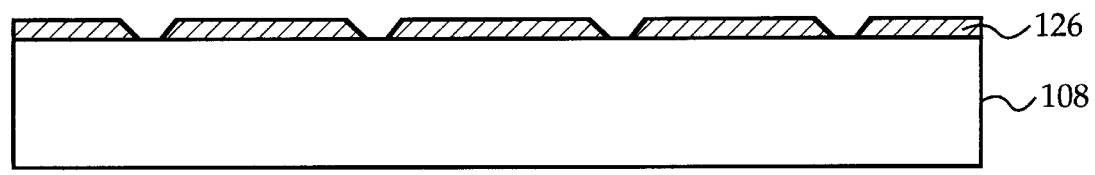

A method for producing the second substrate 108 is illustrated in FIGS. 15A–15F. Referring to FIG. 15A, the second substrate 108 preferably comprises a portion of a single crystal silicon wafer. Alternatively, any type of semiconductor wafer may be used. The second substrate 108 is covered with a sacrificial layer 126 of silicon dioxide which preferably has a thickness of 3 microns. As shown in FIG. 15B, the silicon dioxide layer 126 is patterned and etched into a desired beam pattern, preferably using HF acid.

Figure 15C:
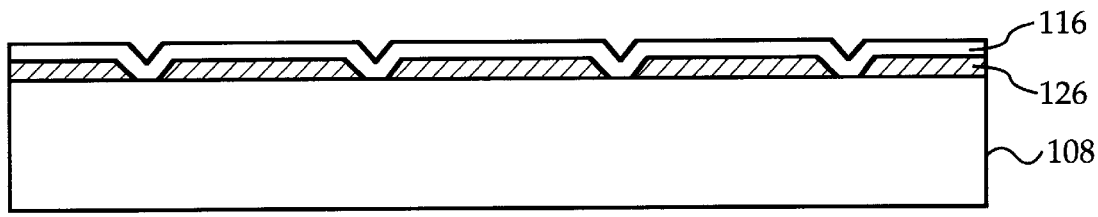
Figure 15D:
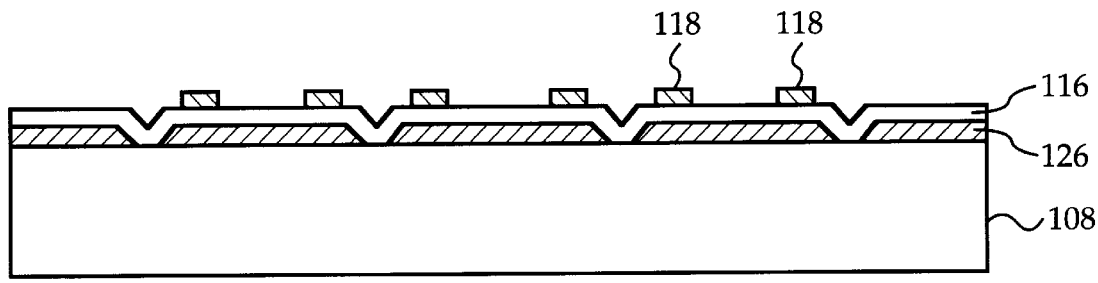

Referring to FIG. 15C, a first beam material 116 is then placed on the oxide layer 126. The beam material 116 preferably comprises polycrystalline silicon and can be deposited on the oxide layer 126 using CVD. A second beam material 118 is then patterned on top of the first beam material 116, as shown in FIG. 15D. The second beam material 118 is selected to have a different rate of thermal or piezoelectric expansion than the first beam material 116. For example, zinc oxide is a suitable second beam material for piezoelectric embodiments, and aluminum is a suitable second beam material for thermal expansion embodiments.

Figure 15E:
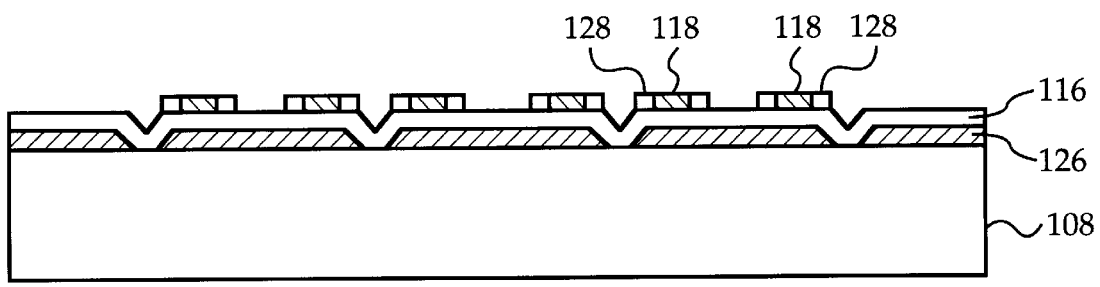
Figure 15F:
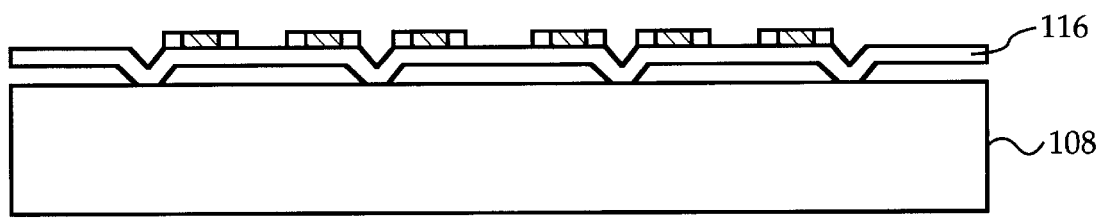

Referring to FIG. 15E, electrically conductive contact pads 128 are then patterned on the first beam material 116 such that the pads 128 contact opposite sides of the second beam material 118. The contact pads 128 preferably comprise gold or aluminum. Following the patterning of the contact pads, the sacrificial oxide layer 126 is removed. The resulting structure is shown in FIG. 15F.

Figure 16:
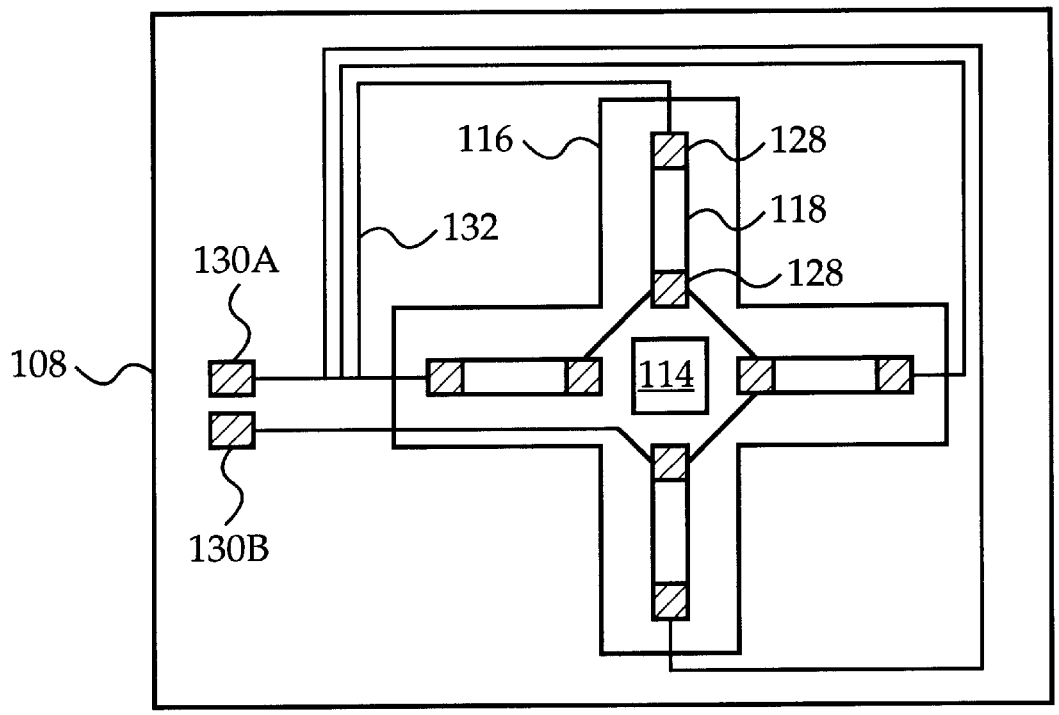
FIG. 16 is a plan view of an actuator of the deformable mirror of FIG. 13.

FIG. 16 shows a plan view of the second substrate 108 in the piezoelectric expansion embodiment. The second beam material 118 is preferably patterned into rectangular pads positioned on top of the first beam material 116. The contact pads 128 are patterned onto material 116 on opposite sides of each rectangular pad. Electrically conductive traces 132 connect the contact pads 128 to a pair of bond pads 130A and 130B. The traces 132 preferably connect the pads 128 in parallel, as shown in FIG. 16. The contact pads 128, bond pads 130, and traces 132 are preferably formed by patterning metal onto the second substrate 108, as previously described in the embodiments above.

In operation, a voltage difference is applied across bond pads 130A and 130B. The voltage difference causes materials 116 and 118 to piezoelectrically expand at different rates, thus bending the beam. Because the bottom portion 114 of the pillar is bonded to the beam, the pillar is actuated to deform the membrane.

Figure 17:
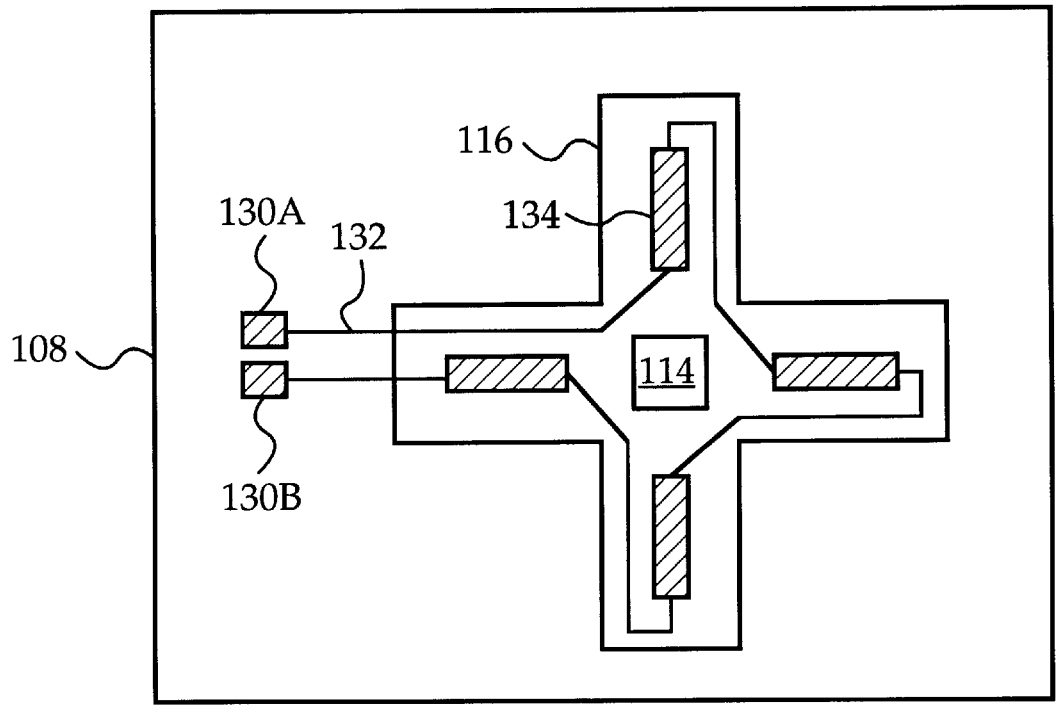
FIG. 17 is a plan view of an alternative actuator for the deformable mirror of FIG. 13.
Figure 18:
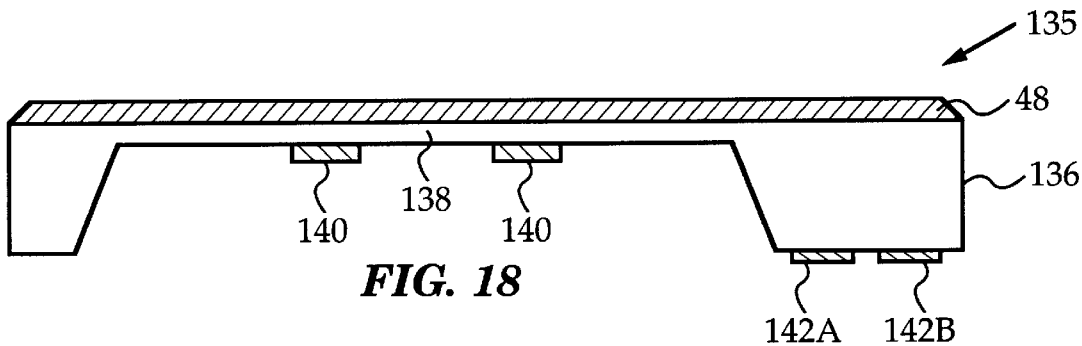
FIG. 18 is a cross sectional view of a single substrate deformable mirror according to another embodiment of the invention.

FIG. 17 shows a plan view of the second substrate 108 in the thermal expansion embodiment. A second beam material having a different rate of thermal expansion than the first beam material 116 is patterned into rectangular pads 134 positioned on top of the first beam material 116. The second beam material is preferably an electrically conductive metal so that no contact pads are required. Traces 132 connect the pads 134 to the bond pads 130A and 130B. The traces 132 preferably connect the pads 134 in series, as shown in FIG. 17. The pads 134, bond pads 130, and traces 132 are preferably formed by patterning metal onto the second substrate 108, as previously described in the embodiments above.

In operation, a current is run through the circuit between bond pads 130A and 130B. The current causes the pads 134 to thermally expand at different rate than the first material 116, thus bending the beam. Because the bottom portion 114 of the pillar is bonded to the beam, the pillar is actuated to deform the membrane.

FIGS. 18–21 illustrate a single substrate deformable mirror 135 according to an alternative embodiment of the invention. The deformable mirror 135 includes a continuous membrane 138 having a bottom surface and a polished top surface. The polished top surface of the membrane forms the mirror surface and is preferably covered with a high reflectance coating 48, such as alternating layers of $SiO_2$ and $TiO_2$. Alternatively, the high reflectance coating 48 may comprise a layer of gold.

The mirror also includes actuator pads 140 positioned on the bottom surface of the membrane 138. The actuator pads 140 preferably comprise a piezoelectric material having a different rate of piezoelectric expansion than the membrane so that when a voltage difference is applied across the pad, the pad expands to deform the membrane. Alternatively, the actuator pads 140 may comprise a material having a different thermal expansion coefficient than the membrane so that when the pad is heated, the pad expands to deform the membrane. Suitable piezoelectric materials include zinc oxide, lead magnesium niobate, and lead zirconate titanate. Suitable thermal expansion materials include aluminum gold and copper. If thermal expansion is used, the pads 140 may alternatively comprise bimetallic strips, e.g. strips comprised of a first layer of aluminum and a second layer of gold.

Figure 19A:
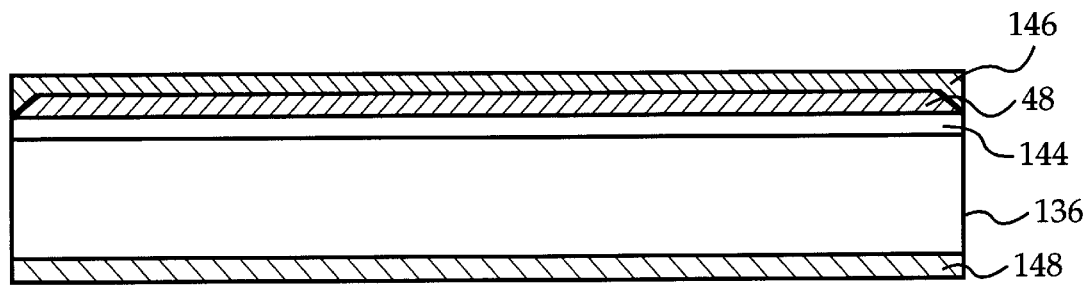
FIGS. 19A–19C are cross sectional views of the deformable mirror of FIG. 18 during various stages of fabrication.
Figure 19B:
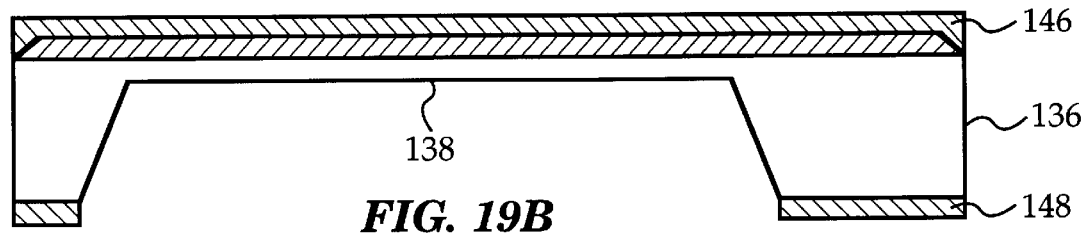
Figure 19C:
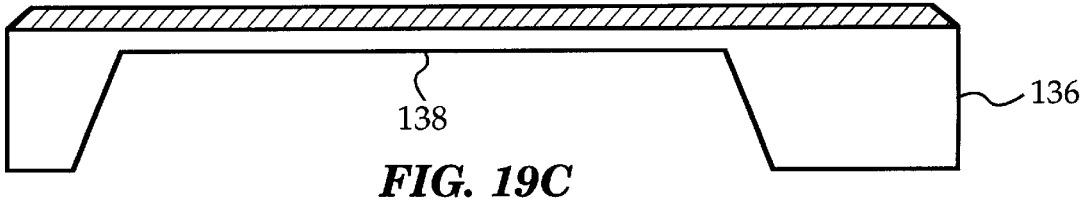

A preferred method for producing the deformable mirror 135 is shown in FIGS. 19A–19C. Referring to FIG. 19A, the substrate 136 preferably comprises a portion of a single crystal silicon wafer. The substrate 136 has a first boron doped layer 144 forming its top surface and extending to a depth corresponding to a desired thickness of the membrane.

As in the first embodiment, the substrate 136 has a bottom surface and a top surface which is polished to optical quality. The top surface of the substrate 136 is covered with a high reflectance coating 48 and the edges of the coating 48 are tapered with a HF acid etch, as previously described with reference to FIGS. 2A–2B. The coating 48 is then covered with a layer of masking material 146, preferably silicon nitride. A layer of masking material 148, preferably nitride, is also placed on the bottom surface of the substrate 136.

Using standard photolithographic techniques, the bottom layer of masking material 148 is patterned to produce a mask on the bottom surface of the substrate, as shown in FIG. 19B. The mask defines a membrane pattern. As in the first embodiment, the membrane pattern preferably includes teeth to form a circular membrane. The substrate 136 is then etched through the mask to form the membrane 138. The membrane 138 is preferably formed by anisotropically etching the substrate 136 using KOH or TMAH. The anisotropic etching advantageously terminates on the doped layer 144 so that the thickness of the membrane 138 may be precisely controlled.

Following the etching of the substrate, the layers 146 and 148 of masking material are removed. The resulting structure is shown in FIG. 19C. It will be apparent to one skilled in the art that this structure may also be produced by using a SOI wafer as previously described above.

Figure 20:
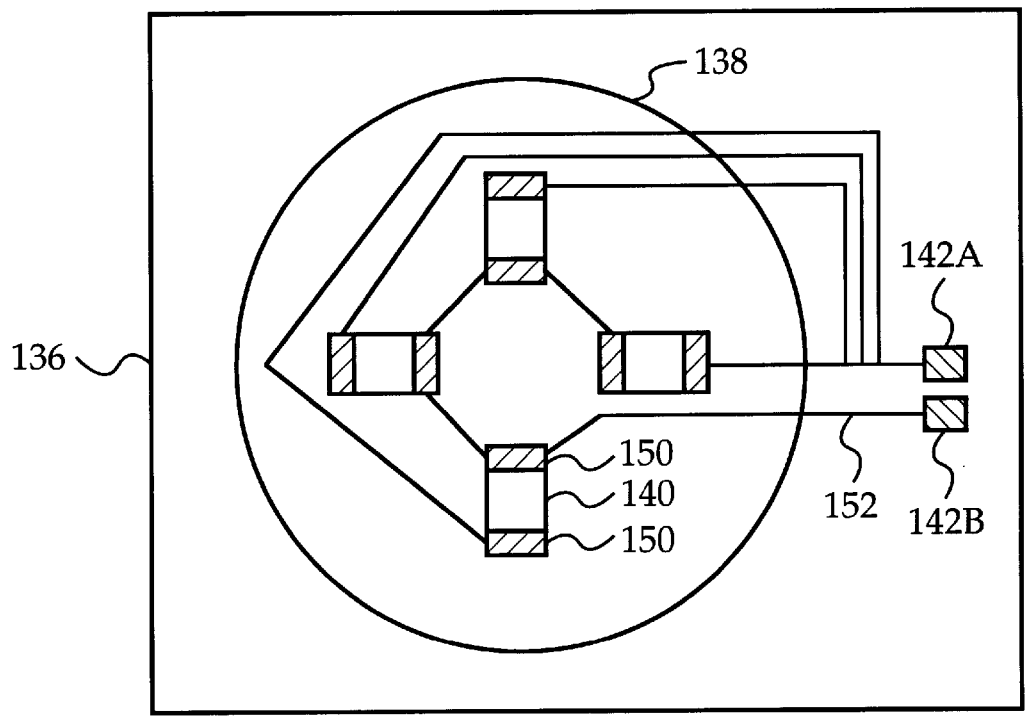
FIG. 20 is a schematic plan view of the deformable mirror of FIG. 18.

FIG. 20 shows a plan view of the substrate 136 in the piezoelectric expansion embodiment. Piezoelectric material is patterned onto the bottom surface of the membrane to form actuator pads 140. Pads 140 are preferably rectangular and preferably have a length in the range of 1 to 5 mm and a width in the range of 0.2 to 1 mm. Contact pads 150 are patterned onto the bottom surface of the membrane on opposite sides of each pad 140. Electrically conductive traces 152 connect the contact pads 150 to a pair of bond pads 142A and 142B. The traces 152 preferably connect the pads 150 in parallel. The contact pads 150, bond pads 142, and traces 152 are preferably formed by patterning metal the bottom surface of the membrane. Specific techniques for patterning metal are well known in the art. In operation, a voltage difference is applied across bond pads 142A and 142B. The voltage difference causes pads 140 to piezoelectrically expand at a different rate than the membrane, thus deforming the membrane.

Figure 21:
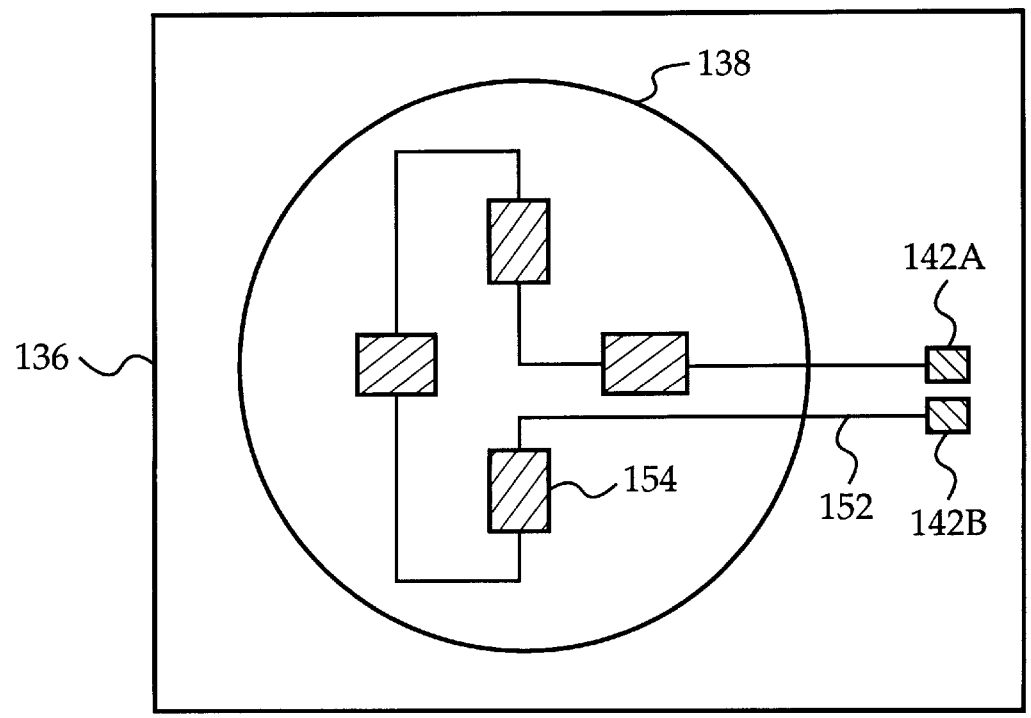
FIG. 21 is a schematic plan view of a deformable mirror according to another embodiment of the invention.

FIG. 21 shows a plan view of the substrate 136 in the thermal expansion embodiment. Thermal expansion material is patterned onto the bottom surface of the membrane to form actuator pads 154. Pads 154 are preferably rectangular and preferably have a length in the range of 1 to 5 mm and a width in the range of 0.2 to 1 mm. Electrically conductive traces 152 connect the pads 154 to a pair of bond pads 142A and 142B. The traces 152 preferably connect the pads 154 in series. In operation, a current is run through the circuit between bond pads 142A and 142B. The current causes the pads 154 to thermally expand at different rate than the membrane, thus deforming the membrane.

SUMMARY, RAMIFICATIONS, AND SCOPE

Although the above description contains many specificities, these should not be construed as limitations on the scope of the invention but merely as illustrations of some of the presently preferred embodiments. Many other embodiments of the invention are possible. For example, it is presently preferred to use a doped boron layer or an insulating layer as an etch stop to define the thickness of the membrane. In an alternative embodiment, however, the thickness of the membrane may be controlled by etching test windows in the outer edges of the mirror wafer. The test windows are etched to a desired membrane thickness. Subsequent anisotropic etching of the wafer to form the membrane and pillars is terminated when the test windows become transparent, indicating that the membrane has the desired thickness.

Additionally, all dimensions stated in the above description are exemplary of the presently preferred embodiments. The exact dimensions of each element of the deformable mirror may be varied to tailor the mirror to the specific application required. Similarly, the number of pillars and arrangement of the pillars in the deformable mirror may be varied to tailor the mirror to the specific application required.

It will be apparent to those skilled in the art that these and many other variations are possible while still falling within the spirit and scope of the invention. Therefore, the scope of the invention should be determined not by the examples given, but by the appended claims and their legal equivalents.

What is claimed is:

1. A deformable mirror comprising:
   a) a first monolithic substrate having simultaneously and integrally formed therein:
      i) a membrane having a bottom surface and a polished top surface; and
      ii) at least one pillar for deforming the membrane, wherein the pillar is integrally formed with the membrane and extends from the bottom surface; and
   b) a second substrate having at least one actuating member positioned thereon for actuating the pillar, wherein the first substrate is mounted to the second substrate such that the bottom surface of the membrane faces the second substrate.

2. The deformable mirror of claim 1, wherein the top surface of the membrane is covered with a high reflectance coating.

3. The deformable mirror claim 1, wherein the actuating member comprises an electrode for applying an electrostatic force to the pillar.

4. The deformable mirror of claim 3, wherein the first substrate further has formed therein at least one support member attached to the pillar, and wherein the second substrate further has at least one pushing member for mechanically pushing the support member to deform the membrane.

5. The deformable mirror of claim 3, wherein the pillar and the bottom surface of the membrane are coated with a layer of electrically conductive material.

6. The deformable mirror claim 1, wherein the actuating member comprises a beam of two materials having different coefficients of thermal expansion, and wherein a tip of the pillar is attached to the beam.

7. The deformable mirror claim 1, wherein the actuating member comprises a beam of two materials having different rates of piezoelectric expansion, and wherein a tip of the pillar is attached to the beam.

8. The deformable mirror of claim 1, wherein the membrane comprises single crystal silicon.

9. The deformable mirror of claim 1, wherein the membrane has a thickness in the range of 10 to 40 microns.

10. The deformable mirror of claim 1, wherein the first substrate comprises a portion of a SOI wafer, the pillar has a top portion comprising an insulating material and a bottom portion comprising single crystal silicon, and the top portion is thinner than the bottom portion.

11. A deformable mirror comprising:
   a) a membrane having a bottom surface and a polished top surface; and
   b) at least one pad positioned on the bottom surface of the membrane, wherein the pad comprises a piezoelectric material having a different rate of piezoelectric expansion than the membrane so that when a voltage difference is applied across the pad, the pad expands to deform the membrane.

12. The deformable mirror of claim 11, wherein the top surface of the membrane is covered with a high reflectance coating comprising alternating layers of $SiO_2$ and $TiO_2$.

13. The deformable mirror claim 11, wherein the top surface of the membrane is covered with gold.

14. The deformable mirror of claim 11, wherein the piezoelectric material is selected from the group consisting of zinc oxide, lead magnesium niobate, and lead zirconate titanate.

15. A deformable mirror comprising:
   a) a membrane having a bottom surface and a polished top surface; and
   b) at least one pad positioned on the bottom surface of the membrane, wherein the pad comprises a material having a different thermal expansion coefficient than the membrane so that when the pad is heated, the pad expands to deform the membrane.

16. The deformable mirror of claim 15, wherein the top surface of the membrane is covered with a high reflectance coating comprising alternating layers of $SiO_2$ and $TiO_2$.

17. The deformable mirror claim 15, wherein the top surface of the membrane is covered with gold.

18. The deformable mirror of claim 15, wherein the material is selected from the group consisting of aluminum, gold, and copper.

19. The deformable mirror of claim 15, wherein the pad comprises a bimetallic strip.

* * * * *